United States Patent [19]

Keasler et al.

[11] 4,206,320
[45] Jun. 3, 1980

[54] HIGH SPEED MODEM SUITABLE FOR OPERATING WITH A SWITCHED NETWORK

[75] Inventors: William E. Keasler, Champaign; Donald L. Bitzer; Paul T. Tucker, both of Urbana, all of Ill.

[73] Assignee: University of Illinois Foundation, Urbana, Ill.

[21] Appl. No.: 934,749

[22] Filed: Aug. 21, 1978

[51] Int. Cl.² ........................................... H04L 27/30
[52] U.S. Cl. ......................... 179/2 DP; 179/15.55 R; 370/19; 375/102
[58] Field of Search ..... 179/2 DP, 15.8 BC, 15.8 BP, 179/15.8 BS, 15.8 BW, 15.55 R; 178/69.1; 325/323, 324

[56] References Cited

U.S. PATENT DOCUMENTS

| | | | |
|---|---|---|---|
| 3,522,383 | 7/1970 | Chang | 179/15 BC |
| 3,789,149 | 1/1974 | Clark | 179/15 BC |
| 4,053,713 | 10/1977 | Nitadori | 179/15 BC |
| 4,079,202 | 3/1978 | Payne | 179/15 BC |

*Primary Examiner*—David L. Stewart
*Attorney, Agent, or Firm*—Pollock, Vande Sande & Priddy

[57] ABSTRACT

A modem capable of achieving essentially 9600 bit per second information transfer rate through the switched telephone network. The high bit rate is achieved notwithstanding the variations in the characteristics of the switched telephone network by phase and amplitude modulating a plurality of sub-carriers at a relatively low baud rate. Correlation detection is employed at the receiver to extract or demodulate the information contained in the various sub-carriers. To allow correlation detection with orthogonal signals, each of the sub-carriers is harmonically related to a fundamental which fundamental is, however, slightly higher than the baud rate. This allows the receiver to delay correlation for a "gap" time, which reduces the effect of transients produced by modulation and also provides greater tolerance to inter-symbol distortion. Since the fundamental of all the sub-carriers is higher than the baud rate, the receiver "sees" orthogonal signals during the integration or correlation time which is maintained as the period of the fundamental. In addition to the information sub-carriers, a pair of unmodulated sub-carriers are also transmitted to enable the receiver to maintain the correlation interval in proper synchronization with the transmitter, and to correct for phase distortion and frequency offset.

36 Claims, 17 Drawing Figures

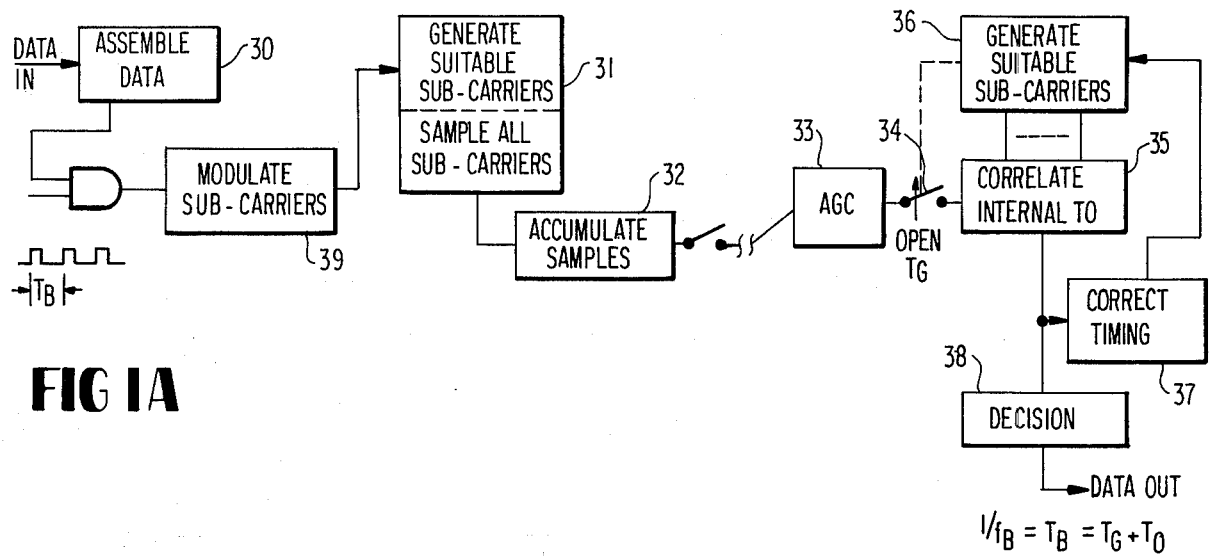
FIG IA
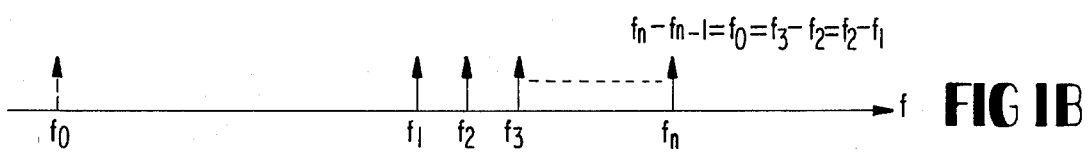
FIG IB
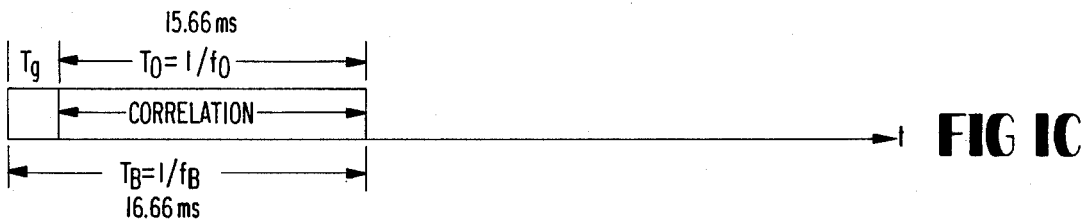
FIG IC
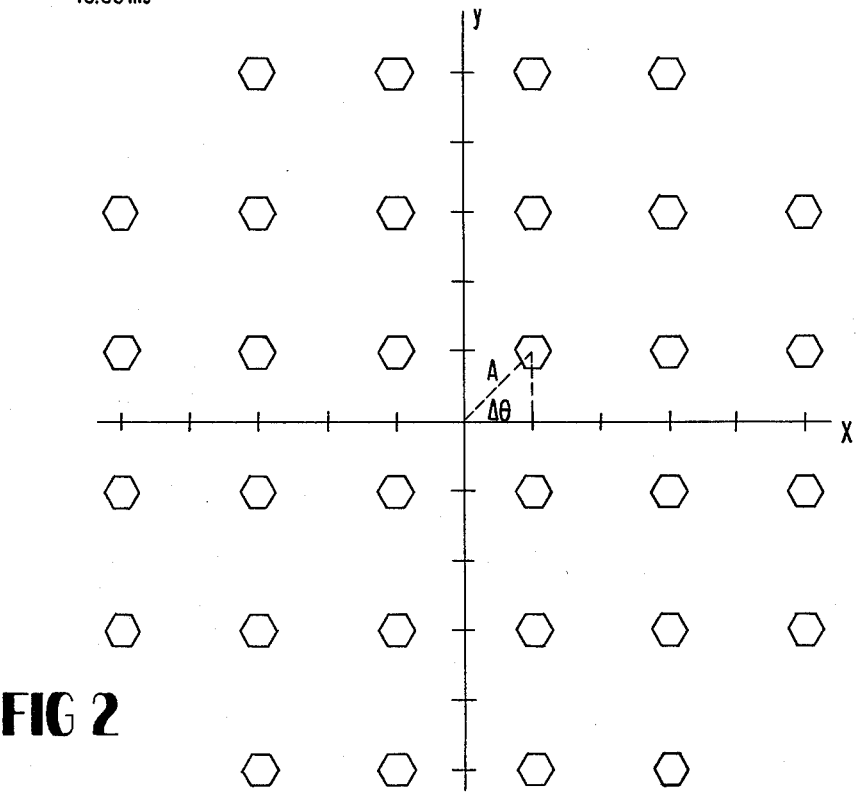
FIG 2

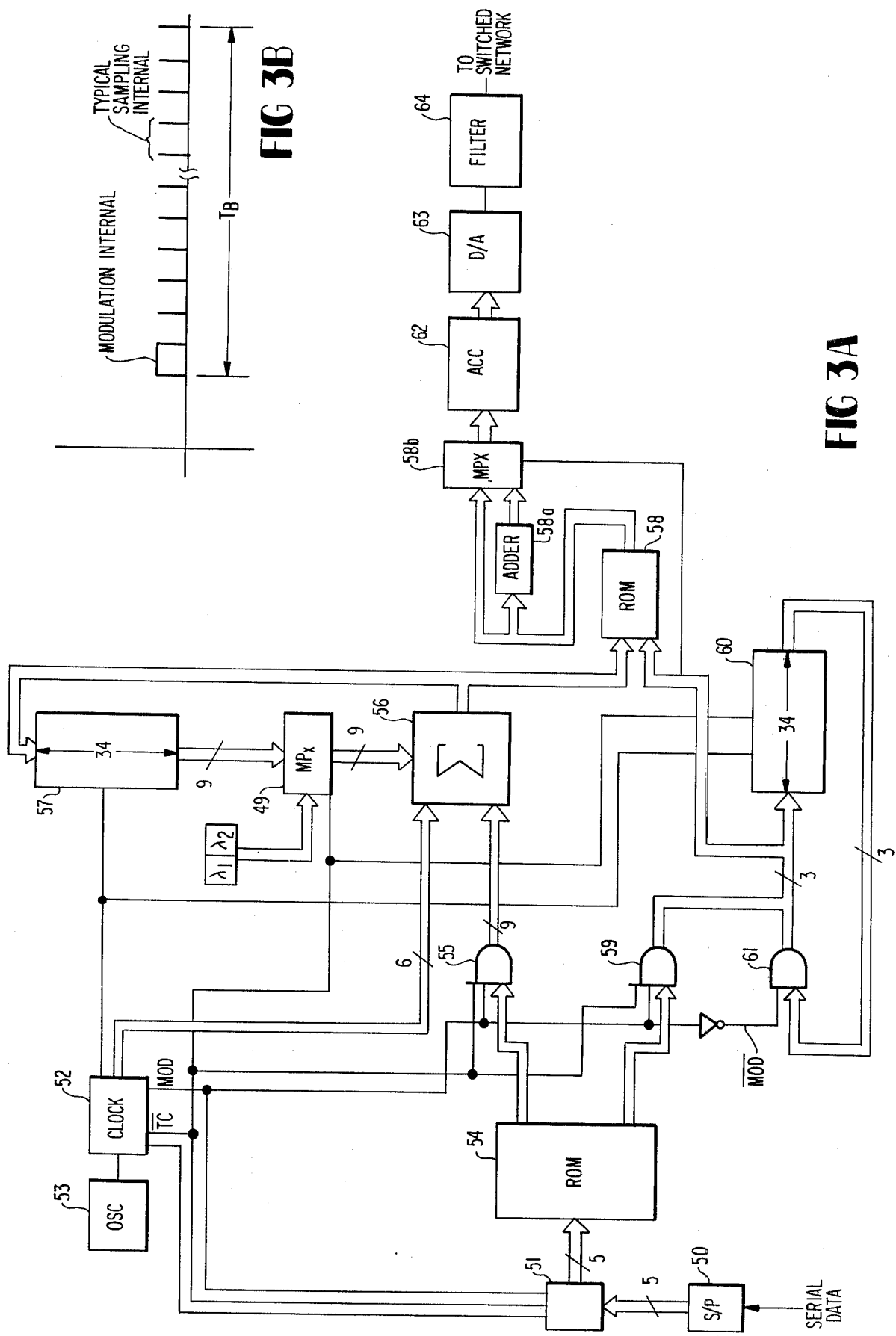

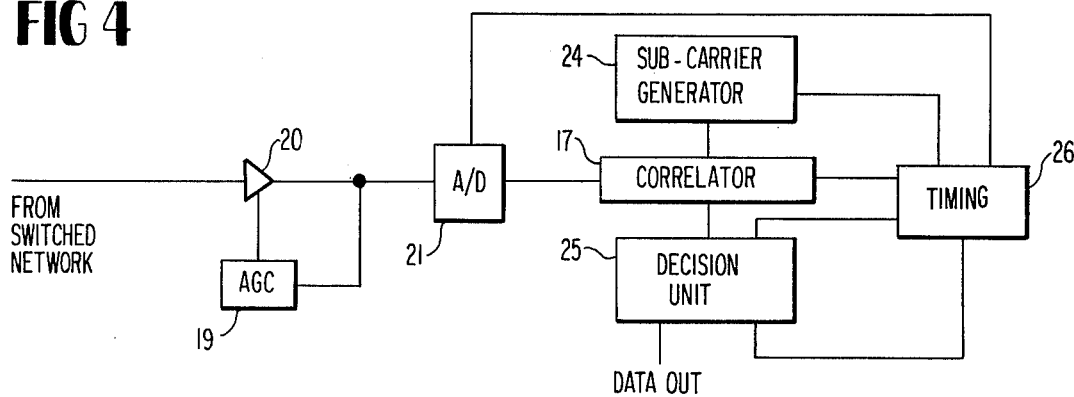
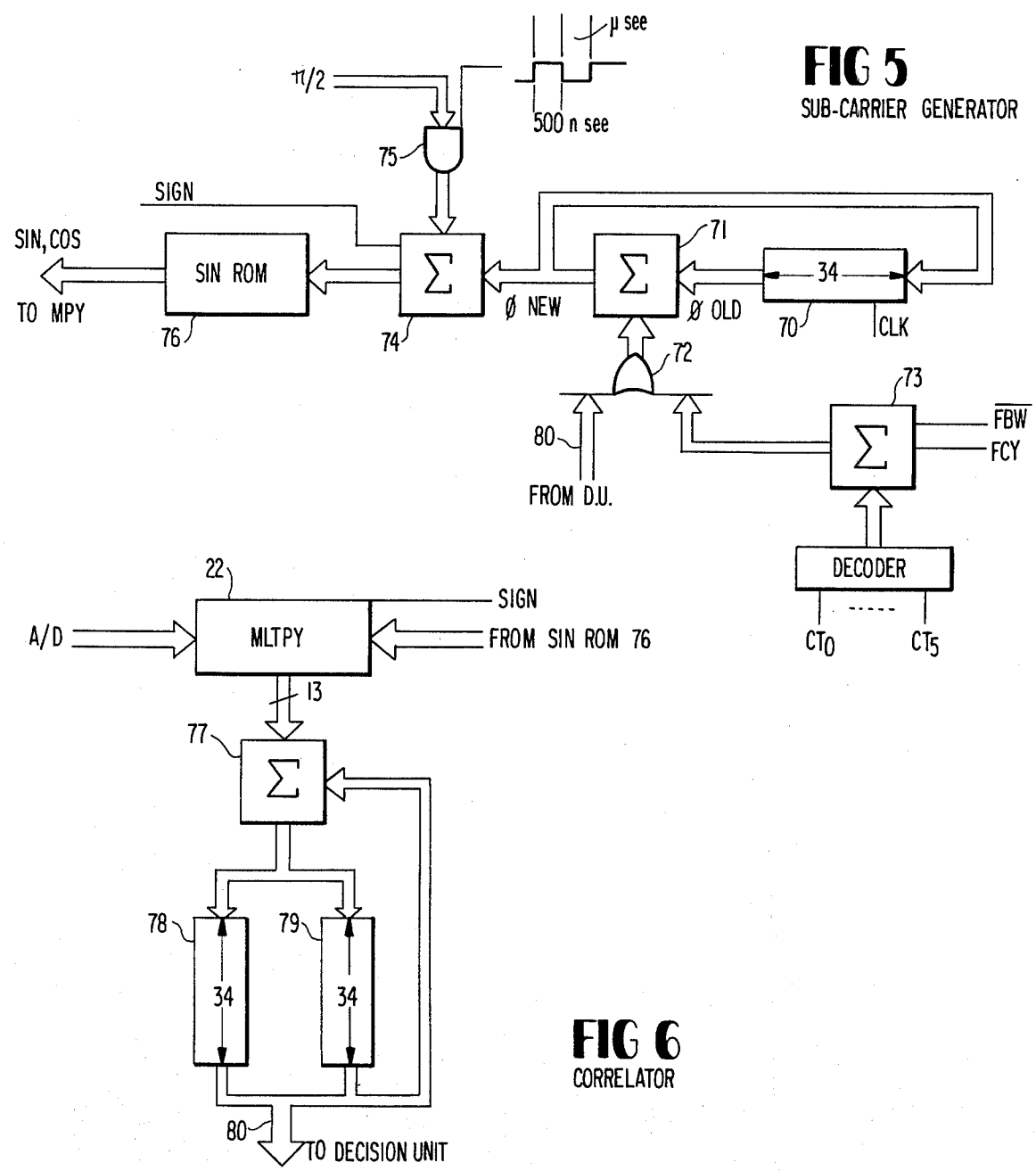

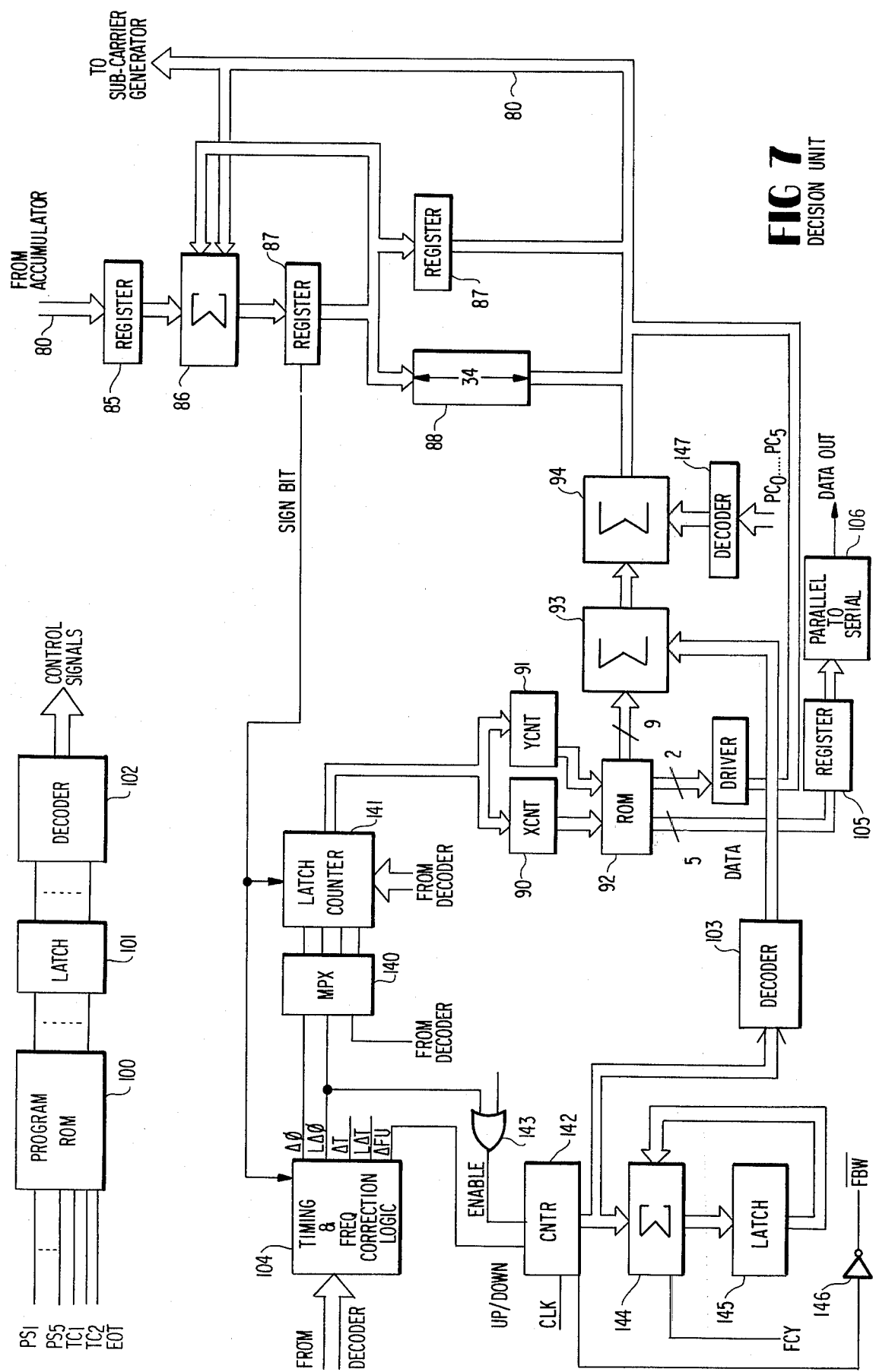
FIG 7 DECISION UNIT

DECISION AND
CORRECTION REGIONS

HIGH SPEED MODEM SUITABLE FOR OPERATING WITH A SWITCHED NETWORK

FIELD OF THE INVENTION

This invention relates to information transmission over a switched network such as the telephone network. The conjunction of relatively high bit rate and relatively low baud rate, resulting in improved noise burst tolerance, makes use of the invention advantageous on non-switched networks as well.

BACKGROUND

Increasing demand for information transfer has made it desirable to employ the existing telephone network for this purpose. The telephone network makes available a variety of grades of services, and it is obviously desirable to employ the lowest grade, and therefore, the most inexpensive, service, as is consistent with acceptable bit error rates.

The typical communication medium made available by the telephone network is an analog channel; accordingly, the need to transfer information which is digital in form has lead to the development of devices to convert digital data into a signal that will propagate on an analog channel, and to correctly convert this signal back into digital form.

Devices of this sort have been available for some time, and are characterized as "modems", shorthand for modulator-demodulator. Stated in the simplest terms, the goal of the modem is to adapt the digital signals to the characteristics of the available transmission medium, i.e., the phone channel. Phone channels come in at least two different types, i.e., leased and switched. The leased channels have characteristics which are maintained to within specified limits. The switched channel, on the other hand, has properties which vary from channel to channel, and are usually characterized by their mean and standard deviation.

The most popular prior art modems can be characterized as high baud rate modems. Generally, these modems require rather precise time equalization to compensate for the telephone channels envelope delay distortion. This particular type of distortion, which comes about because the phase delay encountered by signals of different frequencies is different, is extremely troublesome. This is particularly so since the envelope delay distortion will vary for different lines in the switched network, and thus, the various parameters of the equalization networks cannot be standardized. Rather, these networks must adapt or "learn" proper parameters through actual use. Since most adaptive equalizers require special training signals, the learning process cannot take place during the transmission of real data. Accordingly, the duration of the training period reduces the time available for transmission of actual data. Since the physical channel actually used from call to call will be different in a switched network, the equalization may require adjustment on each different connection. See, for example, "Modems" by Davey, in Proc. IEEE, November 1972, pages 1284-92.

There have been suggestions in the prior art to implement modems which transmit a plurality of bits per signalling element or baud. With multi-bit bauds, the baud rate, which is the rate at which different bauds are transmitted, can be reduced, resulting in a lower baud rate than bit rate. Some examples are Ito, U.S. Pat. No. 3,349,182; Walker, U.S. Pat. No. 3,456,194; Hauber, U.S. Pat. No. 3,579,110; Low, U.S. Pat. No. 3,659,053; Walker, U.S. Pat. No. 3,431,143.

While these systems can reduce the baud rate for a given bit rate, they are not directed at using the switched telephone network as a communication channel, and therefore, do not address the problems caused by envelope delay distortion.

Several of the suggestions referred to above employ a plurality of sub-carriers, modulating each sub-carrier to increase the bit rate without increasing the baud rate. The suggestions also employ correlation detection, that is, each different sub-carrier is separately detected by use of a locally generated noise free replica of the sub-carrier.

In more detail, Whang (U.S. Pat. No. 3,524,023) indicates that a significant problem with respect to data transmission over the switched telephone network is the variation in line characteristics that are expected. One solution to the problem was equalization, i.e., an effort to "smooth" the line characteristics by compensating for distortions in the time domain. Unfortunately, the best equalizers take a significant amount of time to determine the proper equalization for each line. Since equalization is required on each different connection, the time required for equalization is a substantial disadvantage and efforts are going forward to reduce this time, see IEEE Transactions on Communications, Vol. COM-26 #5 (May 1978).

Whang, in U.S. Pat. No. 3,524,023, taught a different technique, i.e., instead of attempting to employ as much of the available bandwidth as possible, and running into severe equalization requirements, he suggested employing a relatively small portion of the available bandwidth, e.g., about ⅓. With this technique, variable equalization was not required since, in the chosen third of the bandwidth, all the telephone lines appear substantially similar. The disadvantage to the Whang approach is, of course, the two-thirds of the available bandwidth that are discarded. Accordingly, Whang claimed the capability of transmitting at a rate of 2400 bits per second through the switched telephone network, which at the time, was considered a radical advance.

Walker, in U.S. Pat. No. 3,456,194, took a different approach to data transmission although not related to switched networks as a communication media. Instead of discarding two-thirds of the available bandwidth, he attempted to employ as much of the available bandwidth as possible, and instead employed a gap or guard space in his regime. More particularly, to provide a large bit/baud ratio, a plurality of sub-carriers are each modulated. To allow coherent demodulation, the sub-carriers are harmonically related. The modulated sub-carriers are transmitted for a time termed the symbol time and modulation is effected at rate corresponding to the symbol time. Walker proposed coherent demodulation, and used a guard space, or gap to reduce intersymbol distortion. In effect, the demodulation process operated for less than the entire symbol time, the difference being the gap or guard space. However, since Walker chose the fundamental as the symbol rate, i.e., the symbol interval was equal to the period of the fundamental, the demodulation took place for an interval which was less than the period of the fundamental. Accordingly, Walker's demodulation took place with non-orthogonal signals, i.e, he could and did expect distortion caused by a contribution in one channel or sub-carrier, from other channels or sub-carriers. To attempt to overcome this difficulty, he attempted to precalculate the contribution in each channel, from all the other channels, and "compensate" for this contribution by using a weighting network. The difficulty with this technique is that the precalculations necessary to determine the weightings require knowledge of the characteristics of the transmission medium. Since Walker is disclosed in the context of a radiated transmission, the approach may be workable. However, employing the Walker technique in the switched telephone network does not appear advantageous since it is the very variations in the characteristics of the communication medium which made use of the switched telephone network difficult in the first place. Therefore, it would appear that applying the Walker technique to data transmission over the switched network would not be appropriate since the weightings will properly apply to only nominal lines which, in the context of the switched network, are usually not available.

However, Walker appears to have an advantage over Whang in that Walker merely discards a portion of the available time bandwidth product equal to the ratio of the gap time or guard space to the symbol time whereas Whang employs only about one-third of the available time bandwidth product.

In accordance with the teachings of the present invention, the disadvantages inherent in Walker are obviated while at the same time, retaining the advantage of employing much more of the time bandwidth product than used by Whang.

It is therefore one object of the invention to provide a transmission system capable of reliably transmitting 9600 bits per second over an unconditioned line in the switched telephone network. It is another object of the invention to perform the foregoing without requiring automatic or variable time equalization as in many prior art modems. It is another object of the invention to achieve the foregoing data transmission rates with acceptable bit error rates and with equipment of reasonable cost, size, etc. It is yet another object of the invention to achieve the foregoing and other objects by using a modem which is readily interfaced with conventional data terminal equipment.

SUMMARY OF THE INVENTION

The present invention overcomes the disadvantages mentioned above by employing several novel techniques providing a high bit rate, low baud rate modem, capable of transmitting 9600 bits per second over the switched telephone network with acceptable bit error rates.

The modem of the invention provides for plural frequency division multiplexed communication channels. Each channel comprising a different sub-carrier, is modulated at a common rate for the transmission of a multi-bit baud per signalling interval or baud time. Demodulation employs correlation detection in which the received signal is separately correlated with a noise-free replica of each of the sub-carriers. Based on the results of the correlation process, the demodulator detects the modulating intelligence and provides corresponding outputs. Each sub-carrier is a harmonic of a fundamental. To reduce errors caused by noise bursts, the baud time is made relatively long to the extent that typical noise bursts are a small fraction of the baud time, for example, the baud time may correspond to a signalling or baud rate of about 60/sec., as compared to typical prior art baud rates of 1600 or 2400/sec. This allows the fundamental to be on the order of 60 Hz. However, the passband characteristics of the telephone network preclude use of the fundamental or the very low harmonics as sub-carriers.

To minimize the effects of intersymbol distortion, the demodulator is arranged to ignore the received signal for a portion of the baud time near the beginning, thus creating a gap or guard time in the time sequence of demodulator operation. To maintain the orthogonality of the signals being correlated, the time during which correlation takes place, (i.e., the correlation time) is selected as the period of the fundamental. Thus, by selection, each sub-carrier has an integral number of cycles in the correlation time. To account for the gap or guard time, the baud time is increased beyond the correlation time by the amount of the gap or guard time.

To increase the bit rate, for given baud rate and number of channels, we prefer to modulate each sub-carrier with the equivalent of a multi-bit quantity. To do this, we use a combination of amplitude and phase modulation, although it is within the scope of the invention to use amplitude and phase modulation combinations different from those disclosed herein or to use amplitude or phase modulation to the exclusion of phase or amplitude modulation.

Thus, in accordance with the invention, an information transmission system includes means for synchronously generating a plurality of information sub-carriers, each of the information sub-carriers harmonically related to a fundamental $f_0$, means are provided for assembling the information for transmission into a plurality of separate information groups, equal in number to the number of information sub-carriers, means are provided for modulating each information sub-carrier with a different one of the information groups, and means are provided for transmitting the modulated information sub-carriers for a period $T_b$, i.e., the signalling interval, wherein the signalling interval is greater than the period $T_o$ of the fundamental $f_0$.

Preferred embodiments of the invention employ digital techniques for the generation of the sub-carriers, modulation, transmission, and demodulation thereof.

At the modulator, a pair of shift registers are employed, one with a stage for maintaining phase representation for each of the sub-carriers, the other with an equal number of stages for storing an amplitude representation for each of the sub-carriers. Generation of the sub-carriers is digitally simulated by updating the phase of each sub-carrier as a function of time and generating a sample of each sub-carrier at the time its phase is updated. Modulation is effected once per baud time for all sub-carriers by changing the stored amplitude and phase for each sub-carrier in accordance with the modulating intelligence. Thus, during each baud time, plural samples of each of the sub-carriers are generated. A single sample for each sub-carrier is coupled to an accumulator once in each sampling interval, and the sum of samples from each sub-carrier is transmitted. In each baud time, there are a number of sampling intervals and during each the modulator transmits the sum of a sample from each of the sub-carriers.

The described shift register implementation which leads to sequential updating of all sub-carrier phases in the order of the sampling intervals is not essential to the invention. If there are m sampling intervals and n sub-carriers, and we denote $\phi_{xy}$ as a sub-carrier phase, where x represents sample interval and y represents sub-carrier, then the shift register implementation produces $\phi_{11}, \phi_{12}, \phi_{13}, \ldots \phi_{1n}, \phi_{21}, \phi_{22} \ldots \phi_{2n} \ldots \phi_{m1}, \phi_{m2} \ldots \phi_{mn}$, in time sequence. This implementation reduces the required storage for it only requires n storage locations, one for the updated phase of each of n sub-carriers. On the other hand, with increased storage, all the samples for all sub-carriers can be generated and stored in any desirable order. One desirable order of generating sub-carrier phases is to generate $\phi_{11}, \phi_{21}, \phi_{31} \ldots \phi_{m1}, \phi_{12}, \phi_{22} \ldots \phi_{m2}$, and so on, i.e., generate all samples for a given sub-carrier and then proceed to the next sub-carrier and so on. Once all samples of all sub-carriers are available, they can be read out in the desired order, i.e., $\phi_{11}, \phi_{12}, \phi_{13} \ldots \phi_{1n}, \phi_{21} \ldots \phi_{2n}, \phi_{m1} \ldots \phi_{mn}$. On readout, the trignometric function $$A_y \sin(w_y t + \phi_y) \bigg|_{y=1}^{y=n}$$

is derived and in each sampling interval the sum of all trignometric functions $$\sum_{y=1}^{y=n} A_y \sin(w_y t + \phi_y)$$

is produced and transmitted.

As should be apparent the sequence and technique used for generating sub-carrier samples are numerous. One technique, not yet mentioned, which has the advantage of reducing computational load in generating sub-carrier samples is the FFT.

At the demodulator, the phase and amplitude of each of the sub-carriers must be detected in order to determine the transmitted intelligence. In addition, the frequency and phase of each of the locally generated sub-carriers must be maintained coherent (of like frequency and phase) with those generated at the modulator. To do this, compensation must be provided for phase distortion, frequency offset and amplitude distortion all of which are functions of both time and frequency. To minimize inter-channel and inter-baud distortion, the correlation interval must be maintained with the proper relation to the baud time boundaries. To assist in these functions, the modulator transmits a pair of unmodulated sub-carriers, also called timing channels, the relation between which, as detected at the demodulator, is employed to provide for some of the compensation. In addition, the relation between timing channel phase in adjacent baud times is employed to correct for frequency offset.

In more detail, demodulation of each of the information sub-carriers is made up of an AGC function, a correlation function and a decision function. The AGC function is used to insure that the amplitude range of the received signal is within proper limits to effectively convert the received signal to a digital representation regardless of gain changes in the transmission medium. A further benefit of AGC is to maintain digitial sample word size within proper limits to preclude overflow in later processing such as in the later to be mentioned multiplier.

The correlation process is implemented by generating a corresponding sub-carrier for each of the information sub-carriers (as well as for each timing channel). For the present, we will assume that phase and frequency compensation for telephone line distortion has been achieved, the manner in which this is achieved is explained later.

At the beginning of the correlation time, a process of sampling and digitizing the received signal is begun. Samples are taken and digitized on a periodic basis under control of a system clock. Simultaneously, each of the plurality of locally generated sub-carriers are sampled, once per received signal sample. Each received sample is multiplied by each sub-carrier sample. A memory is provided to store the product. On the next sample of the received signal, the process is repeated except that the product of each multiplication is added to the product of the prior multiplication for the same sub-carrier. The process continues until each received signal sample is multiplied and a sum of products is produced for each sub-carrier. Actually, each sub-carrier is used to generate quadrature representations of the sub-carrier and both are correlated with the received signal. Accordingly, pairs of summed products are produced for each sub-carrier. Each pair represents a vector, from the direction and amplitude of the vector the modulating intelligence can be recovered.

The decision process employs the vector representing signals to produce the transmitted data. The decision process also determines the relationship between each vector with the ideal or expected vector. Variations are treated as amplitude and phase distortions and compensation for the distortion in each channel is effected separately. This compensation has an effect similar to equalization. A prime advantage of the invention is that this "equalization" is driven by real data—and not by training or test signals.

The correlation process also produces vector representation for the timing channels as well. These are employed in the decision process to maintain the proper phase and frequency relation between the locally generated sub-carriers and those generated at the modulator.

In a preferred embodiment of the invention, adjacent harmonics are used as timing channels and preferably, the timing channels are located at or near the center of the frequency spectrum used. The beginning of the correlation interval is marked by appropriately adjusting the phases of the timing channels to have a predetermined relationship. For example, the one timing channel is produced with a predetermined phase and the other timing channel is maintained to have identical phase. Accordingly, at the demodulator, a proper correlation interval is one in which the vectors produced by the correlation process on the timing channels have identical phase. To the extent that the vectors do not have identical phase, the correlation interval must be "moved" and the direction of the necessary movement is determined by the vector phase difference.

The telephone line also may subject the transmitted signals to frequency offsets, which is common throughout the sub-carriers. Frequency offset is detected by comparing vectors of one of the timing channels in adjacent baud times. Changing phase represents frequency offset, the direction of phase change indicates the sign of the offset and the magnitude of the phase change represents the magnitude of the offset. Detection of frequency offset produces a compensation at the demodulator by controlling the rate at which the sub-carrier phase is advanced for all sub-carriers. Alternatively, a measure of the detected frequency offset or incremental offset can be fed back to the modulator for compensation at the modulator.

The present invention can be used as a direct or differential phase modulator. For direct phase modulation, the transmitted phase differs from a reference or absolute phase by the modulating signal. Thus, a reference phase is required. The timing channel can be used as such a reference, but since the baud time is not the fundamental period, sub-carrier phase at the modulator must be continually adjusted to the reference phase. Differential phase modulation relies on the previous phase as the reference and so no adjustments of modulator phase are required. At the demodulator, however, the sub-carriers' phase must continually track the modulators. Accordingly, at the conclusion of each correlation interval, each sub-carrier phase is advanced to ensure demodulator phase tracks modulator phase.

BRIEF DESCRIPTION OF THE DRAWINGS

The present invention will now be described in further detail when taken in conjunction with the attached drawings in which:

FIG. 1A is a functional diagram of the modem processes;

FIG. 1B is a frequency spectrum of the unmodulated sub-carriers, each corresponding to a channel;

FIG. 1C is a timing diagram correlating modulator symbol interval with the gap or guard time and correlation interval at the demodulator;

FIG. 2 illustrates the data encoding;

FIG. 3A is a block diagram of components of the modulator;

FIG. 3B is a detailed timing diagram of a typical baud time;

FIG. 4 is a demodulator block diagram;

FIG. 5 is a detailed block diagram of the demodulator sub-carrier generator;

FIG. 6 is a detailed block diagram of the correlator;

FIG. 7 is a detailed block diagram of the decision unit;

DETAILED DESCRIPTION OF PREFERRED EMBODIMENTS

Figure 3C:
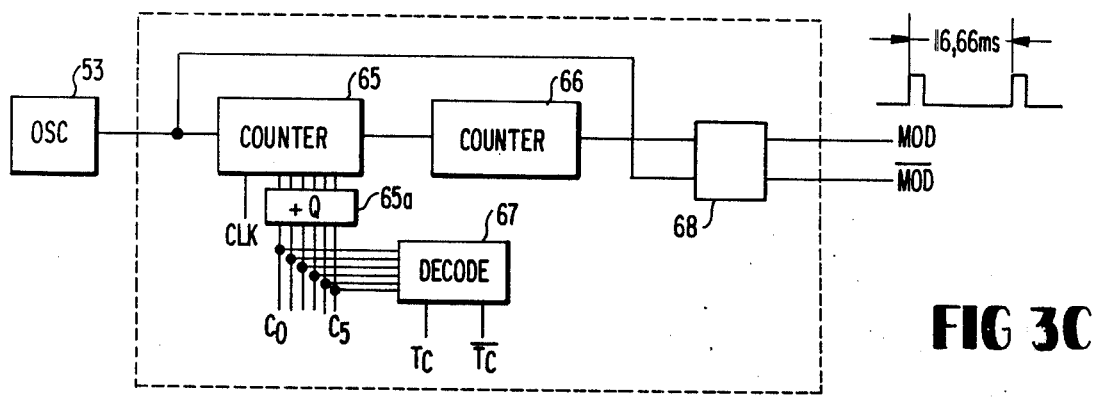
FIG. 3C illustrates the modulator clock.

Before describing the apparatus, it is worthwhile to understand the functions performed. Reference is made to FIGS. 1A through 1C, wherein FIG. 1A represents the functions performed, FIG. 1B is a frequency spectrum illustrating the relation between the suitable sub-carriers, and FIG. 1C is a timing diagram correlating the baud time of the modulator with the correlation interval established at the demodulator.

More particularly, as shown in FIG. 1A, the data to be transmitted is first assembled at function 30. The data is in digital form and can be accepted in serial form. Simultaneously, a plurality of suitable sub-carriers are generated at function 31. FIG. 1B illustrates the relation between the sub-carriers where sub-carriers at frequencies $f_1$ to $f_n$ corresponding to n channels are illustrated. The frequency difference between adjacent sub-carriers is the fundamental $f_0$ (shown dotted); constraints imposed by the bandpass of the telephone network dictate the absolute frequencies employed. The fundamental $f_0$ is shown dotted since it is not a sub-carrier. The distance between $f_0$ and $f_1$, the lowest sub-carrier, is representative of the fact that the lowest harmonics are also not used as sub-carriers. Typical sub-carriers are in the range 500 Hz. to about 2.5 kHz. for use with the telephone network. Sub-carriers of different frequency ranges could be used with other networks depending on the available pass band.

Actually, the generation of the sub-carriers is, in the preferred embodiment, accomplished digitally. Accordingly, only samples of the sub-carriers are produced. Nevertheless, it is within the scope of the invention to generate continuous sub-carriers and modulate them as explained below.

FIG. 1C illustrates the baud time, i.e., $T_b$. The baud rate is $f_B = 1/T_b$. At the demodulator, the correlation time, i.e., the time during which the received signal is operated on to detect the modulation impressed by the transmitter, is the interval $T_0$ which is the period of the fundamental $f_0$. The difference between the baud time and the correlation interval is the gap time $T_g$. During the gap time, the demodulator ignores the received signal, accordingly switching transients and intersymbol distortion is reduced. For reasonable distances between modulator and demodulator, a gap time of 1 ms is sufficient. However, this may be increased or decreased by changing baud time or fundamental frequency. With a 1 ms gap time and a baud rate of 60/sec. the fundamental is about 64 Hz.

Returning now to FIG. 1A, the serial data assembled at the function 30 is coupled to the modulator on a timed basis, i.e., once per baud time, as shown diagrammatically by the AND gate and enabling waveform. Thus, once per baud time, the data modulates the associated sub-carriers, function 39. Once the modulation has been effected, i.e., the phase and/or amplitude has been selected, the sub-carriers are generated for the remaining portion of the baud time.

The baud time is broken down into a plurality of sampling intervals. Once per sampling interval each sub-carrier is sampled and the sample passed to an adder. When all sub-carriers have been sampled and accumulated, function 32, the sum is placed on the switched network. A new sampling interval is begun and the process is repeated. For n sub-carriers, each is represented by a phase $\phi_{xy}$ where x represents sub-carrier (from 1 to n), y represents sample number (from 1 to m). In each sampling interval $\phi_1$ to $\phi_n$ is determined and trignometric function $A_x \sin(w_x t + \phi_x)$ is produced for each sub-carrier ($1 \leq x \leq n$) and $$\sum_{x=1}^{x=n} A_x \sin(w_x t + \phi_x)$$

is determined. The process is repeated for each sampling interval throughout the baud time.

At the receiver, automatic gain control is provided at function 33. A switch 34 is symbolically shown coupling the output of the gain controlled received signal to the correlator which is represented at function 35. The switch is referred to as symbolic for reasons which will now be explained.

As explained in connection with FIG. 1C, the correlation interval $T_0$ is less than the baud time, and it is the operation of symbolic switch 34 which establishes this difference. The correlation function 35 correlates samples of the received signal with the locally generated sub-carriers generated in function 36. Each sub-carrier has a corresponding locally generated sub-carrier at the demodulator. The correlation of the unmodulated timing channels with the corresponding sub-carriers is monitored by the timing function 37 which adjusts the corresponding sub-carrier generator to maintain a desired correlation interval. Finally, the correlation of the modulated sub-carriers and their corresponding sub-carriers are monitored by the decision unit at function 38 which produces the data output.

Function 36 may generate sub-carriers in any suitable manner, i.e., in analog or digital fashion. The received signal may be A/D converted and provided to the correlator as a sequence of samples, i.e., $$R_y \Big|_{y=1}^{y=m}$$

where y identifies the sample. Samples of each sub-carrier are required for each sample of the received signal. Digital generation of the required sub-carrier samples can be effected by storing a phase representation for each sub-carrier and updating the representation for each sub-carrier at the proper rate. In this fashion, a series of phase representations $\phi_{xy}$ is generated (where x represents sub-carrier index from 1 to n and y represents sample number from 1 to m). Since the signal is received and sampled in real time, the phase representations $\phi_{xy}$ can also be generated in real time using a similar shift register technique to that which may be used at the modulator. Namely, $\phi_{11}$, $\phi_{21}$, $\phi_{31}$ through $\phi_{n1}$ is produced within one sampling interval. For each phase representation, the trignometric function $\sin \phi$ and $\cos \phi$ is produced. Each of the trignometric representations is multiplied by the sample of the received signal generating a series of products $R_1 \sin \phi_{x1}$ and $R_1 \cos \phi_{x1}$ as x goes from 1 to n. In the next sampling interval, a similar series of products $R_2 \sin \phi_{2x}$, $R_2 \cos \phi_{2x}$ is generated as x goes from 1 to n. Corresponding products are added, giving a pair of sums $$\sum_{y=1}^{y=2} R_y \sin \phi_y \text{ and } \sum_{y=1}^{y=2} R_y \cos \phi_y$$

for each sub-carrier. This process repeats for each sampling interval so at the conclusion a pair of sums $$\sum_{y=1}^{y=m} R_y \sin \phi_y \text{ and } \sum_{y=1}^{y=m} R_y \cos \phi_y$$

are produced for each sub-carrier. The pair of sums $$\sum_{y=1}^{y=m} R_y \sin \phi_y \text{ and } \sum_{y=1}^{y=m} R_y \cos \phi_y$$

for each sub-carrier represent a vector from which the modulating intelligence can be recovered. The decision process 38 operates on each vector and, from its amplitude and phase determines the modulating intelligence. The decision process also operates on the correlation result of the timing channels to determine the phase relationship of the timing channels and the phase relationship between one of the timing channel phases in adjacent baud times.

From the preceding brief description of the invention, those skilled in the art will readily appreciate that the invention can be implemented with discrete circuits or can be implemented almost wholly within a microprocessor or similar device having the capability of responding to a stored program. Typically, the units will be packaged so that each location has a modulator and demodulator. The remaining portions of the description will disclose a preferred embodiment of the invention in which the modulator comprises a discrete circuit embodiment and demodulator in which the correlator is provided by discrete logic and the decision function is implemented by a special purpose stored program processor.

A Preferred Embodiment

The modulator is shown in FIG. 3A and accepts data in the form of 160 bit groups for each baud time. The 160 bits represent 32 information groups or characters, each consisting of 5 bits. Each character modulates in terms of amplitude and phase change, one of the information sub-carriers. Since there are 32 characters per baud time, 32 information sub-carriers are provided. It will be understood that the number of sub-carriers, and the number of bits used to modulate each, may be varied from the quantities mentioned herein.

The 5 bit character is represented by 1 of 32 possible amplitude and phase change combinations; the selected amplitude and phase change, corresponding to any character, is derived from a read only memory which stores a table of all possible characters and the corresponding amplitude and phase changes. When digital values corresponding to the desired phase change and amplitude are read out of the read only memory storing them, the data is applied to the corresponding sub-carrier generator.

FIG. 2 illustrates the 32 characters (each represented by a pentagon) wherein the coordinates of the character (x, y) satisfy the relation $x = A \cos(\Delta\theta)$ and $y = A \sin(\Delta\theta)$, where A and $\Delta\theta$ correspond to the modulation.

As shown in FIG. 2, the character coordinates are symmetrically located with 8 characters in each quadrant. For example, the 8 characters in the first quadrant are located at (1, 1), (3, 1), (5, 1), (1, 3), (3, 3), (5, 3), (1, 5) and (3, 5). It will be appreciated that this character encoding is regular in form. This simplifies the decision unit which detects the characters. However, it should be understood that the particular character encoding shown in FIG. 2 and the regular order thereof, are not essential to the invention. It should also be noted that the amplitudes shown in FIG. 2 are normalized, i.e., they are relative.

One advantage of the character arrangement shown in FIG. 2 is that there are only 5 different amplitudes employed, i.e., $\sqrt{3}$, $\sqrt{10}$, $\sqrt{26}$, $\sqrt{18}$, and $\sqrt{34}$. The number of different amplitudes that must be generated can be reduced to four by noting that $\sqrt{18}$ is $3\sqrt{2}$. Accordingly, as will become clear below, the modulator is arranged to generate four different amplitudes and the fifth is generated by adding a selected amplitude to twice the selected amplitude to obtain three times the selected amplitude.

In order to generate the 32 information sub-carriers, and the two timing channel sub-carriers, effectively 34 oscillators are required. The 34 oscillators are implemented in digital fashion, a 34-stage shift register stores a phase representation for each sub-carrier. A second 34-stage shift register stores an amplitude representation of the sub-carriers. Each phase representation must be periodically updated to correspond to phase change as a function of time. By properly choosing the phase representation of $2\pi$ and the sampling period the updating function is reduced to periodically incrementing each phase representation by a quantity corresponding to the harmonic index k, where each sub-carrier frequency is $Kf_o$, where K represents the harmonic index. Since phase varies modulo $2\pi$, phase arithmetic must be modulo $2\pi$. In balancing quantization error caused by limited precision and equipment necessary to increase precision we have used a nine bit phase representation, i.e., $2\pi$ is represented by 512. Thus, the adder which is used to update phase performs modulo 512 arithmetic. We sample at intervals of $$\Delta t = \frac{2\pi}{512 W_o} \text{ or } \frac{1}{512 f_o}.$$

Change in phase $\phi$ for any sub-carrier over a sampling interval $\Delta t$ is $$\Delta\phi_x = \frac{f_x \Delta t}{2\pi},$$

since $f_x = k_x f_0$ then $$\Delta\phi_x = \frac{2\pi K_x f_0}{512 f_0}$$

which is $$\frac{2\pi k_x}{512}$$

but since $512 = 2\pi$, then $\Delta\phi_x = k_x$ for our selected sampling interval. Accordingly, updating $\phi_x$ for each sampling interval merely requires adding $k_x$ to each phase representation.

FIGS. 3A and 3B comprise a block diagram of the modulator and a timing diagram illustrating its operation.

More particularly, FIG. 3A illustrates a serial data input stream as provided to a serial to parallel converter 50. The converter 50 presents 5 bit parallel data to a shift register 51 which is clocked by a system clock 52 which, in turn, is driven by oscillator 53. As the 5 bit words representing a character are shifted through the shift register 51, they are made available to a read only memory 54. The data input operation occurs only during the modulation time which is one sampling interval of the baud time as controlled by signals produced by the system clock 52, illustrated in FIG. 3C. Although FIG. 3A is illustrated in conjunction with a serial data stream, those skilled in the art will realize that conventional equipment can be employed to generate a serial data stream from any type of data storage arrangement. FIG. 3B shows the baud time $T_B$ as including a plurality of sampling intervals. As shown in FIG. 3B, the modulation function occupies only one sampling interval. In the typical sampling interval, the clock cycles a phase representation shift register 57 and an amplitude representation shift register 60. As each stage of shift register 57 presents an output to adder (modulo 512) 56 the phase representation is incremented by the harmonic index $k_x$ and the updated value recirculated. In the modulation sampling interval, an additional phase change component corresponding to the modulating intelligence is provided as another input to adder 56. The modulating phase change is provided by ROM 54.

The read only memory 54 stores a multi-bit number for each 5 bit address representing a character. This number may consist of 9 bits of phase information ($\Delta\theta$) and 3 bits of amplitude information (A). Of course, the number of bits for both characters, phase and amplitude, may be varied.

The 9 bits of phase information are coupled as one input to an AND gate 55 (representing, of course, plural gates), which is enabled by a timing signal from the system clock during the modulation sampling interval. The output of the AND gate 55 is coupled as an input to adder 56 which also receives another input (representing $k_x$) from the system clock 52. Finally, a 34-stage shift register 57, each stage 9 bits wide, provides a third input to the adder 56. Each stage of the shift register 57 stores a phase representation one of the 34 sub-carriers. The system clock input to the adder 56 represents a phase increment due to the passage of time, which increment corresponds to the harmonic index for the associated sub-carrier. Finally, during modulation sampling intervals, a third input to the adder is phase change due to modulation. The output of the adder 56 is coupled back to the input of the shift register 57 and also provides one input to a further read only memory 58.

The amplitude information is handled in a similar fashion, i.e., the 3 bits amplitude output is coupled to an AND gate 59 which, during the modulation sampling interval, is enabled by a timing signal from the clock 52. The output of the AND gate 59 is coupled as an input to a 34-stage 3 bit wide shift register 60. The output of the shift register 60 is coupled to the input of an AND gate 61 which is enabled at all times other than the modulation sampling interval. The output of the AND gate 61 is coupled to the input of the shift register 60. The output of the shift register 60 is also coupled as an input to the read only memory 58.

In typical sampling intervals, shift register 60 is completely cycled by the clock 52 once per sampling interval. Each stage represents sub-carrier amplitude. The recirculation path goes through AND gate 61. In a modulation sampling interval, the shift register contents are discarded by disabling AND gate 61 and the modulating amplitude information fills the shift register through AND gate 59.

The trignometric function $A \sin \phi$ is provided by ROM 58 when addressed by A, $\phi$. ROM 58 can store data for phases from 0 to $2\pi$, but this is not necessary. To conserve memory requirements the read only memory 58 can be considered as four, 256 word, 180° sin tables, i.e., a virtual table for each of the four different amplitudes that are produced by the memory. Information respecting the other 180° of the sin table is generated arithmetically by using the relation $\sin(\pi + \theta) = -\sin(\theta)$. Those skilled in the art will realize that a further reduction in the storage of the ROM 58 can be made by using the relation at $\sin(\pi - \theta) = \sin(\theta)$.

In effect, the ROM 58 is addressed by 12 bits, 9 bits of phase and 3 bits of amplitude. Two of the amplitude select bits determine which of the 4 sin tables are used and the remaining bit determines whether the stored amplitude will be employed or three times that amplitude must be generated. When three times the ROM output is selected, the ROM output is fed to adder 58a which, at its output, produces the desired result. The signal from adder 58a and that from ROM 58 is coupled to multiplexer 58b. The multiplexer 58b output is selected as either output of ROM 58 or adder 58a. The least significant 8 bits of the phase quantity address the sin table, and the most significant bit controls complementation. Successive outputs are coupled to an accumulator 62 which is allowed to accumulate over a complete sampling interval, i.e., a contribution from each of the 34 sub-carriers. Under control of the system clock 52, the accumulator is then allowed to make the sum available to the D/A converter 63, and it is cleared and begins accumulation representing the next sampling interval. The output of the D/A converter 63 is coupled to the telephone lines through a low pass and interpolation filter 64.

Figure 3D:
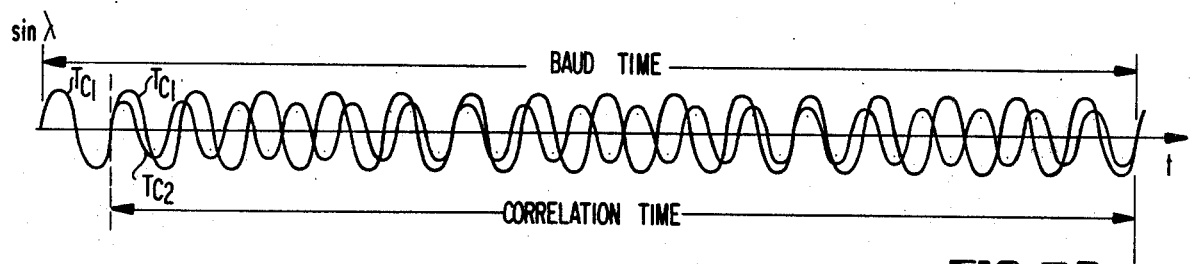
FIG. 3D illustrates the synchronization technique used to mark the correlation interval at the modulator.

It will be seen that each sampling interval is handled identically throughout the modulator, except that in the modulation interval input data, as encoded by ROM 54, is provided to the gates 55, 59, which are enabled for that sampling interval only. Since two of the timing channels are not modulated by data, they are handled separately. For one thing, the shift register 51 is periodically clocked throughout the modulation sampling interval in regular fashion except that the clocking is interrupted at the timing channel times. At those times, the gates 55 and 59 are disabled and correspondingly, gate 61 is enabled. Accordingly, the amplitudes of the timing channels are retained from one symbol interval to the next. The phase of the timing channels are not modulated by data. Actually, the phase of one timing channel may be unchanged. The demodulator is provided with a timing mark with which to synchronize the correlation time. The timing mark corresponds to equal predetermined phases of the timing channels which are adjacent harmonics. FIG. 3D shows sin $\lambda$ as a function of time, wherein $\lambda$ represents the phase of one timing channel $TC_1$. Also shown in FIG. 3D is the correlation time which will be established at the receiver. As shown, the phase $\lambda$ of $TC_1$ is predetermined (for example, zero) at the beginning of the correlation time. To provide $TC_2$ when the same phase may (and normally will) require phase adjustment, and so clock 52 enables multiplexer 49 to couple $\lambda_2$ to adder 56 in the portion of the modulation sampling interval corresponding $TC_2$ interval. Likewise, to ensure that $TC_1$ phase is also zero, a predetermined quantity $\lambda_1$ is coupled by multiplexer 49 in the $TC_1$ phase stage. The quantities $\lambda_1$ and $\lambda_2$ are precalculated to provide the predetermined equal phase for $TC_1$ and $TC_2$ at the beginning of the correlation time. As mentioned, only one such quantity $\lambda_2$ is necessary, the other provides error protection.

FIG. 3C illustrates significant components of the clock 52. More particularly, the oscillator 53, operating at an appropriate frequency, drives a plurality of counters such as the counters 65, 66. One of the counter outputs, labelled CLK, is used to step the shift registers 57 and 60 to thereby establish the basic operating events in the modulator. A signal of like repetition rate steps shift register 51. Since the channel indices are sequential but do not start from zero, an offset Q is added to the output of counter 65 by 65a to provide the $C_0$–$C_5$ signal set providing a binary representation of the channel index. For example, if the channel indices are 8 to 41 then by adding the representation of 7 to the $C_0$–$C_5$ outputs of counter 65, binary representations of 8 to 41 are produced. The outputs labelled $C_0$ through $C_5$ are employed as one input to the adder 56. The outputs labelled $C_0$ through $C_5$ are also provided to a decoder 67 which produces the signal TC and $\overline{TC}$. TC is true when counter 65 has counted to a time slot corresponding to one of the timing channels. These signals are employed at the gates 55 and 59 in order to prevent "modulation" of the timing channels, and also at the shift register 51 to, in effect, create "spaces" in the data stream so that the timing channels in the shift registers 57 and 60 are not overwritten with modulation. A flip-flop 68 provides the MOD and $\overline{MOD}$ signals. MOD is high only in the first sampling interval of each baud time.

From the foregoing description, operation of the modulator of FIG. 3A should be apparent, but it will be briefly described now that the apparatus making up the modulator has been described.

At the beginning of a baud time, the modulate signal is true for one sampling interval, allowing shift register 51 to step along, each step presenting a new character to the read only memory 54. For each step of the shift register 51, the read only memory 54 provides a phase word and an amplitude word corresponding to the character. This operation is continuous during the modulation intervals save that when the signal TC is high, indicating a time slot corresponding to a timing channel, the shift register 41 is momentarily interrupted. As a result, the read only memory 54, during the modulation portion of the symbol interval, produces a stream of phase and amplitude words, interrupted only during the time of each timing channel.

During the modulation interval, each phase word, from gate 55, is added in the adder 56 with the present phase for the corresponding sub-carrier derived from shift register 57 through multiplexer 49. The phase added through the gate 55 corresponds to the modulation impressed on the sub-carrier. Since the shift register 57 recirculates through the adder 56, some means must be provided to account for the phase change from one sampling interval to the next. This is added in from the system clock 52 corresponding to the harmonic index K. As described above during the timing channel time, $TC_1$ and $TC_2$ the phases are set to $\lambda_1$ and $\lambda_2$ by operation of the multiplexer 49. The harmonic index K is added to $\lambda_1$ and $\lambda_2$ in adder 56. As mentioned, the gate 55 is disabled for $TC_1$ and $TC_2$.

Amplitude information is contained in the shift register 60. The shift register 60 recirculates through the gates 61, which is the normal data path except during the modulation sampling interval. During the modulation sampling interval this path is opened at gate 61, and instead the path through gate 59, passing new amplitude information from read only memory 54 is input to the shift register 60. Thus, during the modulation interval the shift register 60 is filled with entirely new amplitude information from the read only memory 54. This is true for each of the information sub-carrier channels. However, in the timing channels, indicated by the signal TC fixed amplitudes are impressed. The fixed amplitude can be selected as any amplitude that is high enough to be detected and low enough to prevent clipping at the demodulator. In one embodiment, we selected this fixed amplitude as about the rms value of the modulation amplitudes. Accordingly, at the conclusion of the modulation portion of the baud time, the shift register 60 is filled with amplitude information for each of the sub-carriers, both information and timing. In the remaining portion of the baud time, the information contained in the shift register 60 merely recirculates through the gate 61.

Figure 3E:
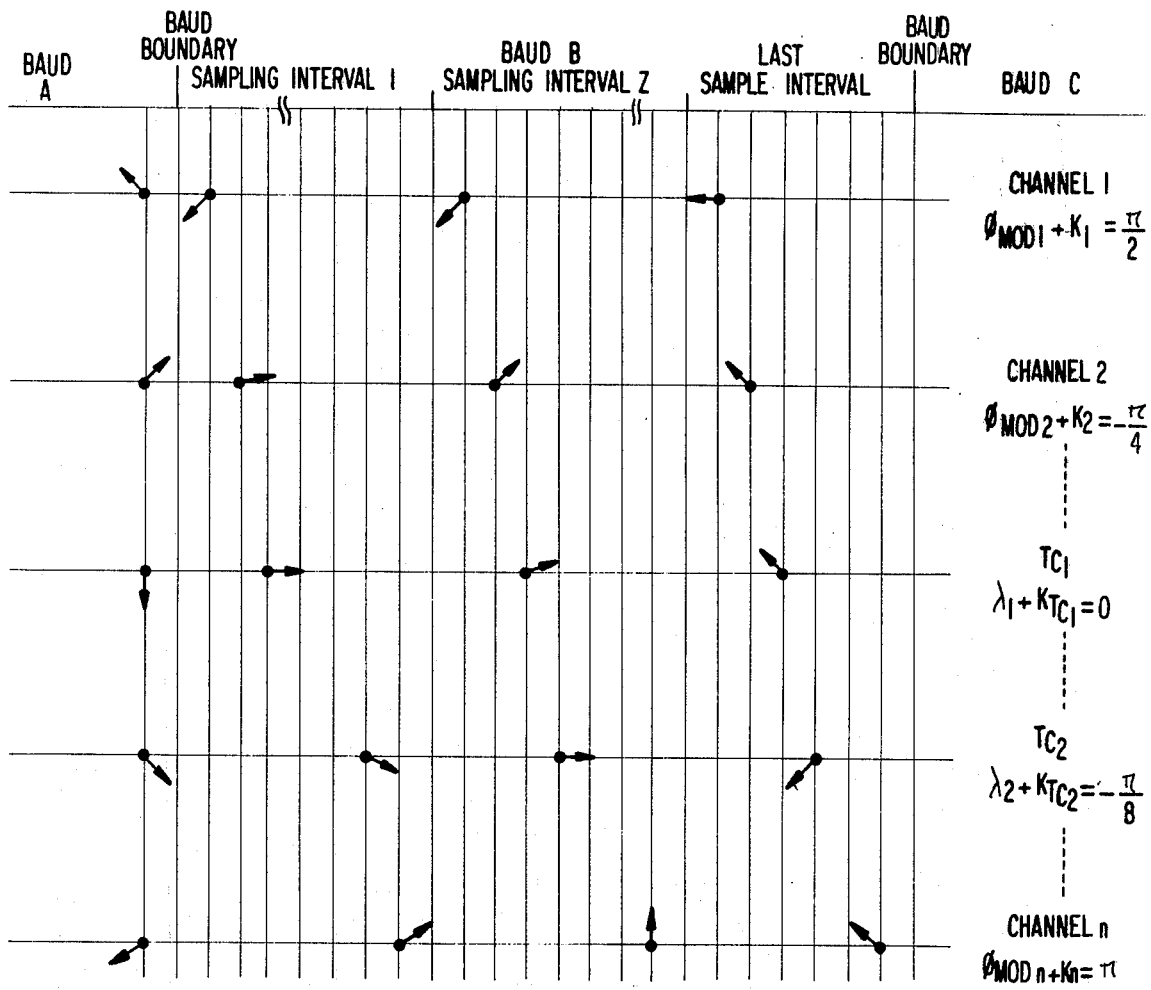
FIG. 3E illustrates phase changes effected at the modulator.

FIG. 3E represents operation of the modulator with regard to phase information. FIG. 3E is a representation of phase changes as a function of time from left to right. At the top, FIG. 3E represents the events taking place for transmission of an arbitrary baud, baud B, which follows baud A and precedes baud C. The time axis is broken up into a number of sampling intervals. Each sampling interval itself comprises a number of sampling times, one for each channel. The sampling intervals are equal to the time taken for a complete cycle of shift register 57 or 60. The transfer of a phase or amplitude word in shift register 57 or 60 to the next stage is a sampling time. Thus, there are a number of sampling times in each interval at least equal to the number of channels. Each phase is represented by a vector, with the angle equal to phase. The phase vectors begin at the left at their position at the conclusion of baud A, that is, the phase in the last sampling interval. Thus, for channel 1, the phase at the conclusion of baud A is between $\pi/2$ and $\pi$. In the first sampling interval, the modulation interval, two quantities are added, $\phi_{MOD1}$, the phase modulation impressed on the channel, and $K_1$ the harmonic index of the channel representing phase change due to time. In our example, the sum of these three quantities is 128 or a digital representation of $\pi/2$ since $2\pi$ is represented by 512. For channel 2, $\phi_{MOD2} + K_2 = -\pi/4$, and a commensurate quantity is stored. The timing channels, $TC_1$ and $TC_2$ are handled differently. As shown, the sum of $\lambda_1$ and the harmonic index K for $TC_1$ is zero. Accordingly, the phase of $TC_1$ goes to that value. A similar result occurs in $TC_2$. The quantities $\lambda_1$ and $\lambda_2$ are selected so that, with $TC_1$ and $TC_2$ phases reset to these values, the phases of $TC_1$ and $TC_2$ at expiration of the guard time or gap are equal and equal to a predetermined quantity such as zero. Note that the "old" phase does not enter into the operation so errors do not accumulate.

In the next sampling interval phase of each channel is also updated. However, in the second and all subsequent sampling intervals, the only change is the addition of the harmonic index K corresponding to that channel. Accordingly, in the second and subsequent sampling intervals, gates 55 and 59 are disabled as MOD goes low.

The foregoing explains how the shift register 57 and 60 are employed to generate and maintain amplitude and phase information of each of a plurality, for example 34, sub-carriers. Throughout the baud time, the output of the adder 56 and gate 59 or 61 provides addressing information to the sine tables contained in the read only memory 58. Accordingly, for each sub-carrier, the read only memory produces an output corresponding to $A \sin \theta$, where the amplitude information is received from gate 59 or 61, and $\theta$, or phase information, is received from the adder 56. In each sampling interval, a sum of all such samples are accumulated in the accumulator 62. At the conclusion of each sampling interval, the sum is converted to analog form and output to the switched network. At the same time, a new sampling interval begins and the process repeats itself. This continues for an integral number of sampling intervals, comprising the baud time.

At the conclusion of the baud time, which repeats at the baud rate, i.e., for example, 60 times per second, a new modulation interval is begun. During the modulation interval, a 5 bit character for each information channel is again converted to amplitude and phase information to modulate the sub-carriers which are, again, sampled and so forth.

In the modulator of FIG. 3A, modulation is impressed on a sub-carrier whose phase at the beginning of a baud time is the same as that sub-carrier's phase at the end of the preceding baud time, i.e., except for the new modulation of phase is continuous across the baud boundary. This necessarily results in a differential system wherein phase change is detected across the baud boundary, i.e., demodulation requires knowledge of the prior sub-carrier phase to determine the phase change engendered by the modulator. This is not essential to the invention since, by resetting the phase memory 57 for each sub-carrier to zero at the beginning of a baud time, direct modulation is produced wherein modulation is detected by comparing sub-carrier phase to a reference or constant phase to detect the modulating intelligence.

Furthermore, the discrete logic of FIG. 3A is also not essential to the invention and could be replaced by a microprocessor or stored program responsive device. In addition, the sequence in which phase change is effected, i.e., sequentially in all channels for each sampling interval, is also not essential. For example, if we denote phase as $\phi_{xy}$, x representing channel (1 to n) and y representing sample number (1 to m) the modulator of FIG. 3A generates $\phi_{11}$, then $\phi_{21}$, $\phi_{31}$...$\phi_{n1}$, then $\phi_{12}$...$\phi_{n2}$, to $\phi_{1m}$...$\phi_{mn}$. However, it is well within ordinary skill to generate phase in an off line fashion wherein all phase quantities are determined and stored before the beginning of the baud time in which the modulating intelligence will be transmitted. A discrete logic or random logic apparatus could then read out phase in proper order and transmit as does the modulator of FIG. 3A. In such a system, phase could be generated in the sequence $\phi_{11}$, $\phi_{12}$...$\phi_{1m}$; then $\phi_{21}$, $\phi_{22}$...$\phi_{2m}$ until $\phi_{n1}$, $\phi_{n2}$ to $\phi_{nm}$.

The Demodulator

The demodulator, functionally illustrated in FIG. 1, is shown in block diagram in FIG. 4. It responds to signals received over a switched network, such as the switched telephone network, and derives from the received signals the information used at the modulator to modulate the information sub-carriers. The equipment at the demodulator performs A/D conversion correlation function and then determines, based on a correlation between the received signal and each of the locally generated sub-carriers, on the intelligence employed to modulate each of the information sub-carriers.

The correlation apparatus includes an analog processing unit as well as a digital processing unit.

The analog processing unit includes the coupling to the communication link which may be by way of a transformer and low pass filter. The output of the filter is coupled to an automatic gain control module comprising a controlled attenuator 20 and a control device to select attenuation level so as to produce the desired automatic gain control. The automatic gain control function enables the information system to adapt itself as gain levels change within the switched network. One of the prime functions of the automatic gain control is to adjust the input level of the serially connected analog to digital converter 21 so as to employ as much of its accuracy as possible. Too much amplitude if not compensated for by the attenuator 20, will result in clipping in the A/D converter 21 and perhaps in the multiplier. In one preferred embodiment of the invention, the automatic gain control function is arranged to maintain the RMS level input to the A/D converter 21 at about ¼ of its clipping level. Those skilled in the art can readily employ analog or digital AGC circuits to maintain the input to the A/D converter 21 at its proper level and therefore a detailed description of the AGC 19 will not be provided.

The output of the A/D converter 21 is provided to the digital correlator 17. A multiplier in correlator 17 receives samples of the received signal from the A/D converter 21 at a convenient rate, for example, approximately every 30.6 microseconds. During the period of each sample, it is multiplied by 34 pairs of signals, each pair representing one of the sub-carriers. Sub-carriers are locally generated by generator 24. Each pair of the signals corresponds to a different one of the sub-carriers generated at the modulator. The multiplication process, therefore, produces 34 pairs of products, for each sampling of the output of the A/D converter. These products are provided to an accumulator which stores the 34 pairs of products. This process is repeated throughout the correlation interval (see FIG. 2C) and the accumulator therefore accumulates 34 pairs of sums. At the conclusion of a correlation interval, the 34 pairs of summed products are available at the decision unit 25 which, based upon analysis of the 34 pairs of sums produces two results. The first result is the data symbol, i.e., 160 bits, corresponding to the modulation input at the modulator. The second result is a correction, to account for distortion, effective at the sub-carrier generator 24 as well as at the timing apparatus 26.

The demodulator sub-carrier generator 24 is shown in detailed block diagram fashion in FIG. 5. The sub-carrier generator 24 operates much in the same manner as does the sub-carrier generator at the modulator, except that only a single amplitude is necessary. However, in contrast to the sub-carrier generator 12 at the modulator, sub-carrier generator 24 produces sine as well as cosine signals.

The sub-carrier generator 24 includes a 34 stage shift register 70, a stage for each one of the 34 sub-carriers being generated. The output of the shift register, representing phase to be updated, is provided to adder 71. The other input to the adder 71 is provided by one of two inputs through the symbolic OR gate 72. During the correlation interval, the effective input is provided by an adder 73 which provides a signal, coupled through the OR gate 72 representing the harmonic index K, similar in function to the input to adder 56 from the clock 52 (see FIG. 3A). Thus, this input represents the phase change due to the passage of time.

The output of adder 71, corresponding to the phase sample is provided to a further adder 74, and is also recirculated to the shift register 70. The adder 74 has, on its other input, a signal provided by an AND gate 75. The AND gate 75 has one input corresponding to a digital representation of $\pi/2$ and a gating signal on its other input. The output of adder 74 is provided as the addressing input to ROM 76 which stores a sine table.

The arrangement of adder 74 and AND gate 75 is provided to enable the sub-carrier generator to produce signals corresponding, respectively, to sine and cosine from the read only memory 76.

Each interval during which the phase sample of a sub-carrier is provided to adder 74 is divided in half by the gating signal on the enabling input to AND gate 75. During one half this interval, AND gate 75 is disabled and accordingly, the ROM 76 produces, at its output, a digital signal representing the sine of the phase which corresponds to the phase sample represented by the output of adder 71; adder 74, during this period, receiving only a single input. In the second half of the interval, the AND gate 75 is enabled and therefore a quantity corresponding to $\pi/2$ is coupled to the second input of the adder 74. Accordingly, the output of adder 74 is the input phase plus $\pi/2$, and, as a result, the ROM 76 produces cosine of the angle whose phase is the output of adder 71. In the example under discussion, since a count of 512 represents $2\pi$, $\pi/2$ is represented by the digital quantity 128. As in FIG. 3A, the ROM 76 stores a sine table for 180° employing the relation $\sin(-\theta) = -\sin\theta$; accordingly, the most significant bit output of adder 74 represents sign.

As the shift register 75 cycles, the output of the read only memory 76 corresponds to sine and then cosine of each of the phases whose digital representation is produced by the adder 71. These signals are coupled to multiplier 22. For the present time, we will ignore the effect of the undiscussed inputs to adder 73 as well as the undiscussed input to the representative OR gate 72.

FIG. 6 comprises a detailed block diagram of the correlator. As shown in FIG. 6, the multiplier 22 is subjected to a pair of inputs, a first input corresponding to the output of the A/D converter 21, and the second input from the ROM 76. The output of the multiplier 22 is coupled to an adder 77 which provides outputs alternately to one of two shift registers 78 and 79. Each of the shift registers 78 and 79 is 34 stages long, one stage for each of the sub-carriers. As the sine and then cosine outputs are provided by the read only memory 76, the products of the sine and cosine with the received signal sample is provided by the multiplier 22 and coupled through the adder 77 to the sine or cosine shift registers 78 and 79, respectively. The rate at which the received signal is sampled allows 34 pairs of products to be produced for each received signal sample. Since the shift register outputs are coupled as the second input to the adder 77, as the sampling and multiplication process proceeds, from one received signal sample to the next, the shift registers 78 and 79 have built up therein, at each stage, the sum of the product of the sine or cosine signals with samples of the received signal. This process proceeds for the duration of the correlation interval. When the correlation interval terminates, the shift registers 78 and 79 each have 34 quantities stored therein, from which the decision unit will determine the modulating intelligence.

For each of the 34 stages in the sine shift register 78, the quantity stored therein at the conclusion of the correlation interval can be represented as:

$$X_k = \sum_{m=0}^{m=512} r(m \cdot \Delta t) * \cos(k \cdot m \cdot 2\pi/512 + \phi k)$$

Correspondingly, the cosine shift register 79 accumulates in each stage a sum which can be represented as follows:

$$Y_k = \sum_{m=0}^{m=512} r(m \cdot \Delta t) * \sin(k \cdot m \cdot 2\pi/512 + \phi k)$$

where, in both expressions, k identifies the harmonic index and r is the received signal. Accordingly, each pair of quantities corresponds to a single channel which may be a data channel or a timing channel.

A bi-directional tri-state bus 80 couples the outputs of shift register 78 and 79 as well as one input of adder 77 to the decision unit. The decision unit is shown, in block diagram form, in FIG. 7.

Before describing the decision unit in detail, the function it performs will first be discussed. Each pair of quantities in the shift register 78 and 79 defines a vector of amplitude A and angle $\Delta\phi$, and it is these quantities from which the modulating intelligence can be determined. Accordingly, the decision unit has access to shift registers 78 and 79, over the bus 80, and processes each of the information channels in turn, to derive the modulating intelligence. This could be accomplished by comparing each vector to each of the 32 possible vectors represented in the data array (see FIG. 2). Such a technique would require 32 comparisons for each of the 32 information channels. Although possible, a preferred technique is the technique actually employed in the decision unit which maps each of the data characters onto an XY coordinate system using the relation $X = A^* \cos(\Delta\phi)$ and $Y = A^* \sin(\Delta\phi)$ to form an array of data points, similar to the array of FIG. 2. The decision unit actually operates on an array of squares, i.e., the squares formed by the bold lines of FIG. 8 wherein each data point lies at the center of a different square. The square surrounding each data point is the decision region, and thus it is only necessary to determine which square contains the received vector to determine the modulating intelligence for that channel.

Denoting one half the length of a side of each square as N, the decision region containing the vector can be determined by separately subtracting the quantity N from each of the vector components X and Y. Thus, the decision unit first notes the sign of the quantity and then forms the absolute magnitude. An iterative process is then entered in which the quantity N is subtracted from the absolute magnitude of both X and Y until the result goes negative, keeping track of the number of subtractions. Based on the number of subtractions required to produce a sign change, the decision region containing the received vector is determined. Because the array is, at most, 6N on a side, at most 5 subtractions are required. An attractive feature of this technique is that, in addition to determining in which decision region the received vector lies, it is also possible to determine which quadrant of the decision region in which the vector lies, which information is useful for "tuning" the detection process.

Since the decision unit detects absolute phase, i.e., the phase of the received signal, it is necessary to "know" the channel phase at the beginning of the modulating interval to determine modulation. But this phase is merely the phase of the sub-carrier at the conclusion of the last correlation interval and is, indeed, "known". Accordingly, for differential modulation, wherein phase change is correlated with data, it is necessary to insure that the demodulator sub-carrier generator "tracks" the modulator. Accordingly, at the conclusion of the data detection process, channel phase is aligned with the transmitted phase so that, in the next baud time, the new modulating intelligence can be detected as a phase change.

Those skilled in the art will understand that this is, however, not essential to the invention, and that the data may be correlated with phase referenced to absolute phase. With such regime, the modulator sub-carrier generator has its phase set to zero at the beginning of each modulation interval and the modulating information changes that phase in accordance with the intelligence. At the demodulator, the phase of each of the waveforms being generated is unaltered, i.e., the demodulator sub-carrier phase does not track the modulator phase. Although either technique can be employed, the embodiment under discussion employs the former technique wherein the demodulator phase is adjusted at the conclusion of each correlation interval, and accordingly, the demodulator phase tracks the modulator phase.

The magnitude of the quantity N nominally a system parameter dependent upon the gain of the communication link, is not known, and is also variable with frequency and time. Thus, the location of the vector within the decision region can be, and is employed to adjust the quantity N individually for each channel.

Likewise, the communication link will also introduce phase shift, which may be frequency and time dependent. Again, the location of the vector in the decision region is employed to adjust for this extraneous phase shift.

Figure 8:
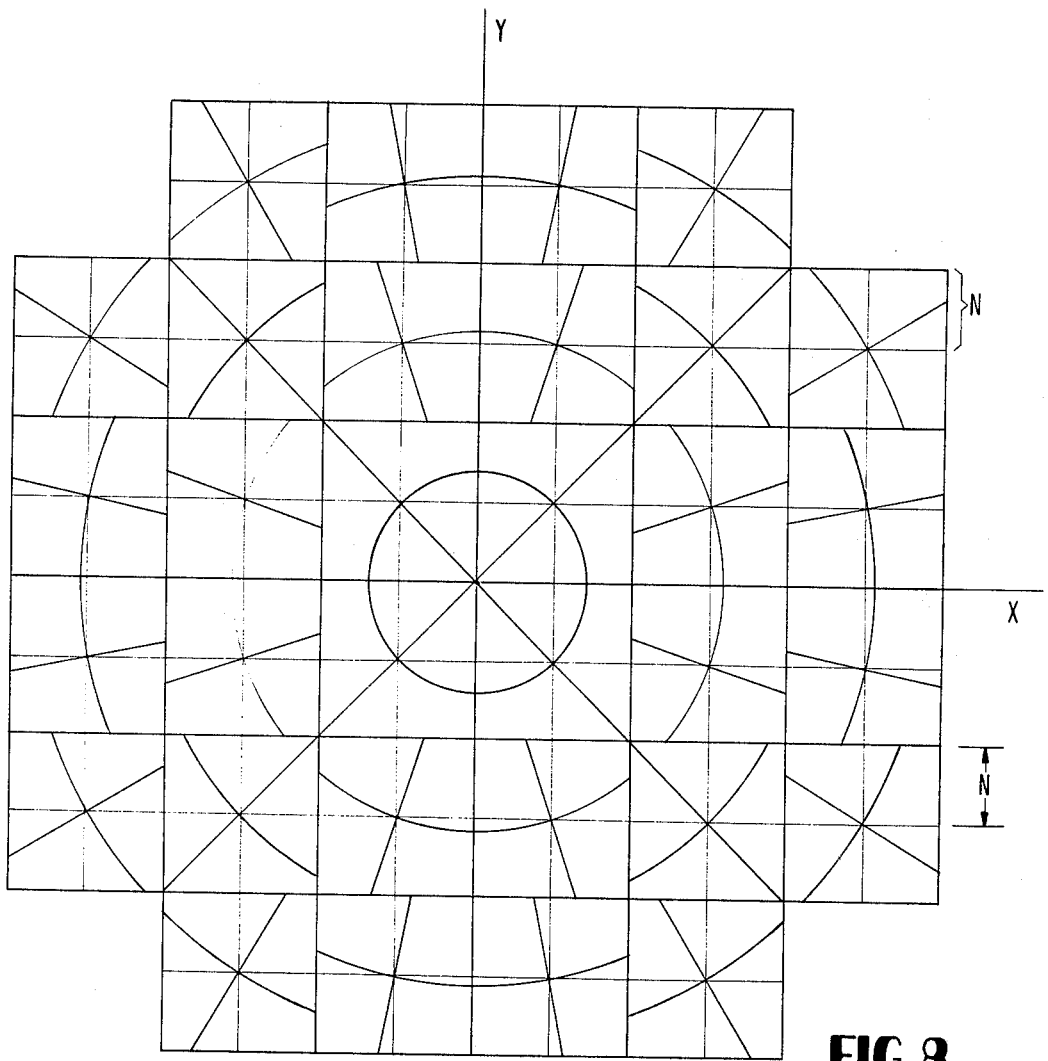
FIG. 8 illustrates the decision regions implemented at the decision unit.

These corrections are made by determining in which quadrant of the decision region the received vector lies. Ideally, these regions have boundaries composed of radial lines and are segments of a circle, i.e., they are not regular. It is much simpler, however, to implement these correction effects by employing decision sub-regions in the form of squares as is shown in FIG. 8.

Accordingly, the results of the subtraction process, i.e., the number of subtraction cycles and the remainder for both X and Y coordinates, are mapped, for example, with a read only memory, into phase shift, phase correction, data and N correction. The sum of the phase shift and phase correction are employed to adjust the phase of the sub-carrier to insure that the demodulator phase tracks modulator phase and to compensate for phase distortion. The data is output and the N correction is used to adjust the quantity N used for that channel in the next baud time. The foregoing description applies only to the information sub-channels.

The decision unit also processes the two timing channels to derive synchronization and control information. For one thing, the correlation interval must be precisely synchronized with the theoretical correlation interval, i.e., occupy the entire baud time following the guard space, and repeat at the proper rate. In addition, frequency offset must also be eliminated. The decision unit, in processing the timing channels, detects the sign of the phase of one of the channels the phase difference between the channels and the frame to frame rotation of that channel. The first two quantities are used for synchronization, the last is employed to detect and correct for frequency offset.

The phase of both timing channels were adjusted, at the modulator, so that they would have a predetermined relationship (equal and equal to zero) at the beginning of the correlation interval. The phase of each timing channel is determined by the decision unit. If the correlation interval at the demodulator is correctly located in time, the phase relationship is maintained. If there is a difference between the phases in these channels then the correlation interval must be adjusted in time to drive this difference to zero. The sign of the phase of one of the channels is employed to determine in which direction the correlation interval must be moved to reduce the phase difference to zero. In order to simplify the correction process, only two different corrections are allowed, a small or a large correction. A threshold level is set, and if the time error is larger than the threshold, then the large correction is employed and the sign of the phase of one channel is employed to determine in which direction the correction should be made. The correction is made by adding a phase change to each timing channel of the form $kp\Delta t$, wherein $\Delta t$ is the amount of a time correction, p is a constant and k is the channel index. If the phase difference between the two timing channels is less than the threshold, the small correction is employed (i.e., a different quantity is selected for $\Delta t$).

Frequency offset is determined by the direction of rotation of one of the timing channels. More particularly, the quantities in the registers 78 and 79 for this channel are matched against the "old" parameters (i.e., prior baud register quantities for this channel) and a determination is made as to the direction of phase change.

Figure 9:
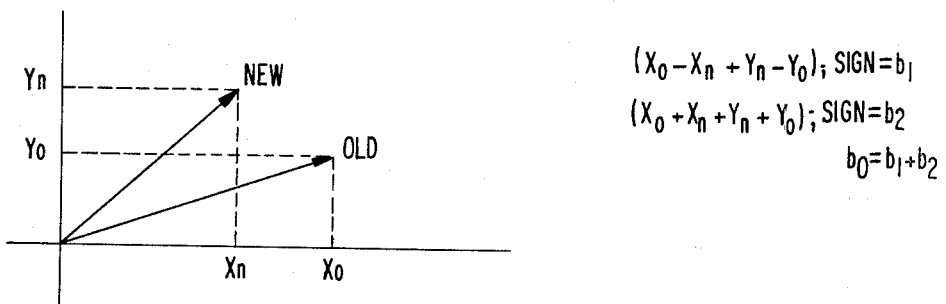
FIG. 9 illustrates the frequency offset detection technique.

FIG. 9 illustrates two vectors, one labelled "old", the other labelled "new", the old and the new vectors representing the processing results of one of the timing channels for adjacent baud times. This information is available to the decision unit from the shift register 78 and 79 (see FIG. 6). To detect frequency offset, the sums shown in the upper right hand corner of FIG. 9 are formed; that is, $(X_O = X_n + Y_n - Y_O)$ and $(X_O + X_n + Y_n + Y_O)$ where O represents "old" and n represents "new". The decision unit notes the sign of the expressions, $b_1$ is the sign of the first expression, $b_2$ is the sign of the second expression. The sum $b_0 = b_1 \oplus b_2$ is formed, if $b_0$ is 0 then the phase is advancing from frame to frame whereas if $b_0 = 1$ the phase is retarding from frame to frame. The decision unit, based upon the result, makes the correction for frequency offset, the sense of the correction depending upon the result $b_0$.

Returning now to FIG. 7, a block diagram of the decision unit is illustrated. As shown, a program control 81 comprising a read only memory 100 has signals stored therein representing the desired processing functions. These functions fall into two major groups or routines, a first routine for processing an information channel and a second routine for processing timing channels. The program control is addressed by signals from the timing unit 26. The output of ROM 100 is latched in latch 101 and decoded in decoder 102 from which control signals are coupled to various other portions of the decision unit. A tri-state bus 80 interconnects the various units which enables them to pass information between accumulator, registers 78, 79, decision unit and the sub-carrier generator. The direction of information flow on the bus is established under the control of the program ROM 100 which signals are decoded and distributed by decoder 102.

As shown in FIG. 7, then, the decision unit includes a buffer 85 coupled to the tri-state bus 80 to couple the quantities contained in the shift registers 78 and 79 to adder 86. The output of adder 86 is coupled to a register 87 which can pass information to a 34 stage shift register 88 or a single stage register 89. The output of both shift register 88 and the register 89 are coupled also to the bus 80.

A pair of latches 90 and 91 provide addressing inputs to a read only memory 92. One output of the read only memory 92 is coupled to an adder 93 which also receives, as another input, a frequency offset correction signal from the decoder. The sum produced by the adder 93 is coupled to an adder 94. The output of the adder 94 is also coupled to the bus 80.

In processing an information channel, the contents of the associated stage of shift register 78 is first coupled to the buffer 85 over the bus 80.

The sign bit is noted in the logic 104 and then the absolute value is coupled back as one input to adder 85. The corresponding N value from register 34 is also coupled to adder 86 over the bus 80 and the difference obtained. Simultaneously, the latch counter 141 is incremented and the N value is again subtracted from the difference. The process is repeated until a sign change is detected. At a sign change, the X or Y count is retained in latch 90 or 91 and the same process is repeated but this time with the contents of the ohter shift register 79. At the conclusion, the decision region containing the information channel vector is identified by X and Y, the count in latches 90 and 91. Since there are at most 12 regions for each component, each component contributes 4 bits to the result. Accordingly, the latches 90 and 91 produce an 8 bit result. The 8 bits form an address for ROM 92 which produces three outputs. A first output is the 5 bit character word which is coupled to register 105 and in turn, to parallel to serial converter 106. As each information channel is processed, in turn, the concatenated 5 bit output words produce the 160 bit data originally input at the modulator. The phase shift and phase correction, corresponding to the decoded vector phase are output as a 9 bit word. Phase shift is the angle of the nominal vector, phase correction is the difference in angle between the received vector and the ideal vector. Adders 93 and 94 correct for effects to be discussed later. The phase change (sum of phase shift, phase correction and frequency offset corrections to be discussed) is, however, coupled to OR gate 72 (FIG. 5) where it is used to update the corresponding phase word for the channel. This enables the demodulator to both "track" the modulator phase and to correct for phase distortions introduced by the communication process. Finally, the third output of ROM 92 is 2 bits of data for correcting the quantity N associated with the channel. This data is coupled through a driver 107 over the bus 80 to adder 86 where it is summed with the previous N value. The result is coupled through register 87 and stored in the shift register 88 at the appropriate location. This completes the decision unit processing for an information channel. To process the next channel, shift register 88 is incremented to make available the N value associated with the channel to be processed, shift register 70 is incremented to make the channel's phase word available for correction, and the next X and Y values are obtained in turn from registers 78 and 79.

Processing of the timing channels is somewhat different. Actually, two different routines are used to process the timing channels, these routines are used on alternate baud times which baud times are identified by the state of EOT, coupled from the timing unit to ROM 100. In one set of alternately occurring baud times, routine A is performed only to correct for errors in the initiation of the correlation interval. To determine whether a small or large error is present, a threshold is established by subtracting $|X_{TC2}|$ from $4 \cdot |Y_{TC2} - Y_{TC1}|$, where the alphabetic character identifies a value obtained from register 78 or 79 and the subscript identifies the channel. Equality means the correlation time is within 650 $\mu$s of ideal and so a small correction is used, as will be disclosed. If the difference is positive, the error is larger, and a large change is used. If the correlation time had begun exactly at the correct time, $Y_{TC2} = Y_{TC1}$ since the phase of both were equal as transmitted. Comparing $4 \cdot |Y_{TC2} - Y_{TC1}|$ to $|X_{TC2}|$ allows some margin and establishes the threshold. A comparison of channel phases is used rather than comparing the phase of either to a determined quantity since that test would be rendered useless by phase distortion. The calculation is made in adder 86 and the sign bit, coupled to logic 104 is used to determine the size of the correction. The sense of the correction determines $\Delta T$ and is controlled by the phase of one of the timing channels, represented, for example, by the sign of $Y_{TC2}$. Thus, $\Delta T$ indicates whether the phase of $TC_2$ is positive or negative and determines the sense of the correction, $L\Delta T$ is controlled by the comparison and determines the magnitude of the correction. The apparatus can distinguish between transient or short term errors and long term effects, such as those caused by differences in the crystals in modulator and demodulator. Before further describing the apparatus of FIG. 7, the demodulator clock will be briefly explained.

Figure 10:
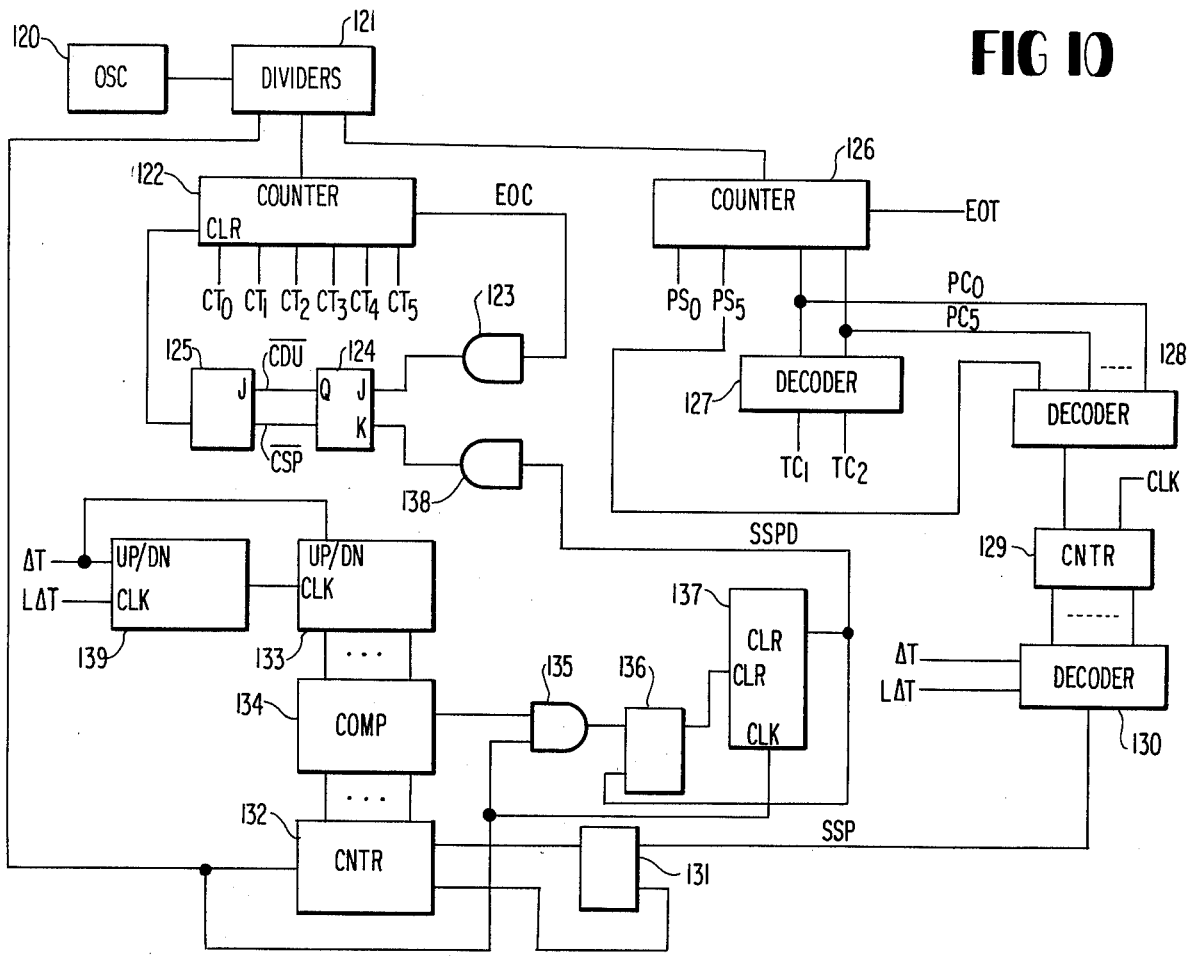
FIG. 10 is a block diagram of the demodulator clock.

FIG. 10 shows the demodulator clock and some of the significant signals generated thereby. An oscillator 120 producing an appropriately high frequency (approx. 11 MHz.) is divided down by divider 121. The divider produces several clocking signals, which are sub-multiples of the frequency of oscillator 120. One of the clocking signals runs a counter 122. Counter 122 produces the $CT_0 - CT_5$ signal set which is decoded and provides the harmonic index input to adder 73 (FIG. 5). Counter 122 also produces the EOC (End of Correlation) signal after the given plurality of samples comprising the correlation interval is concluded. EOC provides, through AND gate 123, an input to flip-flop 124, whose output is an input to flip-flop 125, whose Q output controls the CLR input of counter 122. Accordingly, counter 122 provides for a repetitive cycle but the delay beween cycles is controlled by flip-flop 124, in a manner now to be explained. A further counter 126 operates at half the rate of counter 122. This counter produces the signal sets $PS_0 - PS_5$ and $PC_0 - PC_5$. The signal set $PC_0 - PC_5$ also corresponds to the various timing channels, i.e., decoder 127 produces the signals $TC_1$ and $TC_2$, identifying the timing channels. These signals ($TC_1$ and $TC_2$) and the signal set $PS_0 - PS_5$ are the addressing inputs to ROM 100 (see FIG. 7) as well as EOT (also produced by counter 125) identifying alternate baud intervals. A counter 129 is clocked at half the rate of counter 126 and is enabled by a signal from decoder 128 representing a specified point in the cycle established by counter 126. The outputs of counter 129 are coupled to a decoder 130 which also receives the $\Delta T$ and $L\Delta T$ signals from the logic unit 104. Based on the $\Delta T$ and $L\Delta T$ signal combinations decoder 130 outputs a signal SSP advanced or delayed a small predetermined time ($\pm 1$ $\mu$sec) or a large predetermined time ($\pm 30$ $\mu$sec) from nominal output. The $\Delta T$ and $L\Delta T$ signals are produced by flip-flops in logic 104 (as will be disclosed). These signals are set during the operation of the decision unit in one baud time and are effective at decoder 130 in the next following baud interval. Accordingly, based on the phase comparison in one baud interval the start of the correlation time in the next baud interval is advanced or retarded by a large or small amount.

The SSP signal sets a flip-flop 131 which enables counter 132, clocked at the same rate as counter 129. The actual beginning of the correlation interval is based on a comparison between the contents of counter 132 and a further counter 133 as effected in comparator 134. On comparison, AND gate 135 is enabled to set a flip-flop 136 which allows counter 137 to count. The ripple count output of counter 137 is the signal SSPD, which also serves to reset flip-flop 136 to ensure that the counter 137 remains in the cleared state. The SSPD signal enables AND gate 138 to reset flip-flop 124, which had been set on EOC. Change of state of flip-flop 124 causes a change in state of flip-flop 125 to enable counter 122 to count again. Accordingly, the gap or guard time, at the demodulator is established by the delay between EOC and SSPD, which, as has been explained, is varied by the $\Delta T$, $L\Delta T$ signal combination based on a phase comparison of the timing channels $TC_1$, $TC_2$.

In addition, the counters 133 and 139 are provided to compensate for drifts between the oscillators at modulator and demodulator. Since oscillator drifts are cumulative, a long term drift could cause the correlation interval to move beyond the amount of correction provided by the decoder 130. To account for this possible effect the counter 133 can have its count changed. Since the relative delay between SSP and SSPD depends in part on a comparison between counters 132 and 133, incrementing or decrementing the count in counter 133 can change the time relation between SSP and SSPD. In each symbol interval, the $L\Delta T$ and $\Delta T$ signals can increment or decrement counter 139, but only if a large phase difference is noted, i.e., one exceeding the threshold of $4 \cdot |Y_{TC2} - Y_{TC1}| - |X_{TC2}|$. Counter 139 thus represents a running indication of any bias in the direction of large phase errors. If the bias exceeds the threshold established by the capacity of counter 139 an output clocks counter 133, in the sense of the last error. In this fashion, the delay between SSP and SSPD can be changed. It should be noted that the count of counter 133 is effective on each baud interval until the count is changed. This contrasts with the effect of decoder 130 which provides transient correction, i.e., only for a single baud time.

Referring again to FIG. 7, the $\Delta\phi$ and $L\Delta\phi$ signals from the logic 104 are also based on the comparison of $4 \cdot |Y_{TC2} - Y_{TC1}| - |X_{TC2}|$, but are used to make compensating corrections of phase to the phase words stored in shift register 70. Multiplexer 140, during processing of the timing channels couples the $\Delta\phi$ and $L\Delta\phi$ signals to latch couner 141. Latch counter 141 functions as a simple counter in processing of information channels, under control of the decoder 102. However, during processing of timing channels it does not count but merely latches in the output of multiplexer 140. Accordingly, during processing of timing channels the $\Delta\phi$ and $L\Delta\phi$ signals are coupled to ROM 92 as addressing inputs via the latches 90 and 91. The ROM 92 has stored quantities representing phase corrections for either large or small phase errors. These quantities follow the same path to the register 70 as does the phase corrections from ROM 92.

Finally, the program A also stores the values $X_{TC2}$ and $Y_{TC2}$ from register 88 into register 89 where it will be used in processing for frequency offset.

As mentioned, routine A, just described, is run on alternate baud intervals. Another routine B operates in the intervening baud times as noted by EOT. Routine B is identical to routine A except for frequency offset correction which will now be explained. Frequency offset is detected by comparing the phase of one of the timing channels across a baud boundary. This phase comparison requires noting phase sign on either side of the baud boundary as well as phase rotation across the baud boundary. The sign of $Y_{TC2}$ determines whether the phase is between $\pi$ and 0 or between $\pi$ and $2\pi$. To determine rotation, a pair of sums is formed ($X_O - X_n + Y_n - Y_O$) and ($X_O + X_n + Y_n + Y_O$) where X and Y refer to quantities from register 78 or 79 and the subscripts O and n refer to preceding symbol and present baud, respectively (see FIG. 9). The sums are formed in turn in register 87 and the sign bits $b_1$ and $b_2$ are noted, for the first and second sums, respectively, by logic 104. The result $\Delta F_u$ is the result of exclusive ORing of $b_1$ and $b_2$ and indicates the rotation direction. It can be shown that the first sum is equal to $A \sin 2\Delta\theta$ and the second is equal to $A \cos 2\Delta\theta$ wherein $\theta$ is the sign of $Y_{TC2}$, $\Delta\theta$ is the rotation between symbol intervals and A depends on $\theta$ and $\Delta\theta$.

Referring again to FIG. 7 the signal $\Delta F_u$ is coupled as the UP/DOWN control input to counter 142. Counter 142 is enabled via OR gate 143 from $L\Delta\phi$ or a gate from decoder 102. Accordingly, the contents of counter 142 count up or down a predetermined amount representing a correction for the noted frequency offset. Counter 142 provides an input to decoder 104 and adder 144. The output of adder 144 is coupled to a latch 145, which provides a second input to adder 144. In effect, counter 142 retains the effective estimate of frequency offset correction, which is maintained by updating the quantity by the output of counter 142 for each processing cycle. The frequency offset correction circuit provides two outputs FBW indicating a negative count in counter 142 and FCY indicating overflow from adder 144. These signals are coupled to adder 73 where they are used to change the LSB input to adder 73. Accordingly, each of the channels receives an equal correction for frequency offset. More particularly, for a given correction the increment to phase on each cycle of the shift register 70 is changed in an equivalent manner for all channels. Since the frequency change is a rate of phase change the compensation is able to compensate for the frequency offset since the incrementing or decrementing quantity changes the phase rate of change and does so equally (and not proportionally) for each channel.

Since the shift register 70, containing a phase word representing the phase of each channel, operates discontinuously, i.e., only during the correlation interval, these phase words must be advanced to account for phase change during the gap time or guard space. Adders 93 and 94 provide this correction.

As each channel is processed the phase advancement for each channel that would have occurred in the gap time or guard space is computed by decoder 147 which receives as an input the signal set $PC_0 \ldots PC_5$ identifying the channel being processed. The gap time or guard space is a constant and so it is a simple matter to provide a decoder to produce an output in terms of phase representation of phase change for this fixed time increment. Phase change corresponding to modulation and distortion for each information channel, in turn, is output from ROM 92. Adder 94 merely adds the phase change during the gap time or guard space thereto, and the sum is written into the appropriate location of shift register 70.

One final phase change that must be effected is the phase change due to detected frequency offset (for the processed baud interval) which took place in the gap space or guard time. The frequency offset detected for the symbol interval is available in counter 142. The equivalent phase change for the fixed gap time or guard space is computed in decoder 103 and added, by adder 93, to the sum of phase modulation and phase distortion provided by ROM 92.

The corrections produced by adders 93 and 94 are the same for both timing and information channels.

Figure 11:
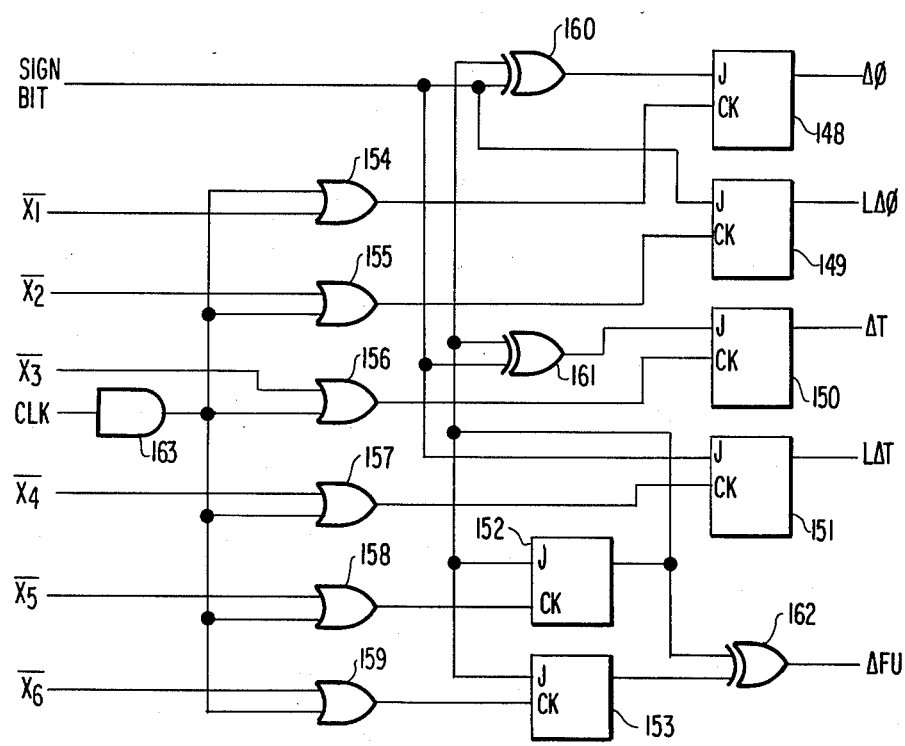
FIG. 11 illustrates the correction logic of FIG. 7.

The logic 104 is shown in logic level diagram in FIG. 11. As shown, the sign bit from register 87 is an input to flip-flops 149, 151–153 and exclusive OR gates 160 and 161. OR gates 154–159 receive decoder 102 output signals $\overline{X1}$–$\overline{X6}$ and a clocking signal from AND gate 163. The output of OR gates 154–159 are the clocking inputs to flip-flops 148–153, respectively. The other input to exclusive OR gates 160 and 161 is the Q output of flip-flop 152. Finally, the Q outputs of flop-flops 152 and 153 are the inputs to exclusive OR gate 162. Flip-flops 148–151 produce, respectively, $\Delta\phi$, $L\Delta\phi$, $\Delta T$ and $L\Delta T$ while gate 162 produces $\Delta F_u$.

The demodulator thus far explained employs differential modulation where the phase of each channel at the demodulator tracks the corresponding modulator phase. This requires a phase word in the register 70 for each of the channels. However, as explained above, the differential modulation is not essential and direct modulation can be used. With direct modulation the modulating phase change is made with respect to a reference—such as one of the timing channels. Since the modulation can be decoded entirely within a single baud a phase word memory is no longer required for each channel. Assuming that the modulator phase is reset at the beginning of each baud time, then no phase memory at the demodulator is required across a baud boundary. Instead, the reference phase for any sampling time is generated as a function of frequency and time between the baud boundary and the sampling interval. Each other channel phase for the same sampling interval is obtained by merely adding a constant to the phase of the adjacent lower frequency channel. Decision unit processing can also be simplified. A comparison is made between TC vector and nominal TC vector. The difference is the reference vector against which other vectors are compared to derive the modulation.

If the switched network were free of distortion and noise, the information channel vectors would merely have to be compared to the reference or timing channel to yield the modulation vectors.

However, because the phase and gain characteristics of the switched network are generally not flat with respect to frequency, the values used for comparison must be adjusted for channels in different parts of the frequency spectrum.

The information channels nearest the reference or timing channel which may be in the middle of the spectrum, are processed first. The closest received vector is determined and subtracted from the actual normalized vector. The difference or error is an indication of the distortion characteristics.

Based on the detected error vectors, the reference vector is adjusted for each transition from one channel to the next outer channel.

By progressing from the center channels to the outer channels and adjusting the reference vector at each step, the routine can track large values of phase and gain distortion without prior knowledge of the line characteristics.

Those skilled in the art will appreciate that many other changes can be made within the spirit and scope of the invention. For example, the modulator disclosed herein marks the beginning of the correlation time by resetting phases of both timing channels to be equal and equal to zero. Neither is essential; any modulator which provides for a predetermined phase relationship between the timing channels at the beginning of the correlation time is adequate. In addition, as mentioned at the outset, the frequency correction for frequency offset, present in the demodulator, i.e., the $\overline{FBW}$ and FCY inputs to adder 73 can be eliminated by making this correction at the modulator. More particularly, the signals $\overline{FBW}$ and FCY are transmitted back to the modulator where they are used, for example, at adder 56, to compensate for frequency offset.

What is claimed is:

1. A modulator-demodulator for the transmission and reception of information adapted for efficient information transmission through a switched network and for reducing the effects of distortions produced by the unknown characteristics of the transmission medium, said modulator comprising:

means for generating representation of plurality of synchronous information sub-carriers, each of said information sub-carriers harmonically related to a fundamental $f_0$, means for assembling information for transmission into a plurality of separate information portions, equal in number to the number of information sub-carriers, means for modulating each representation of an information sub-carrier with a different information portion, means for transmitting representation of said modulated information sub-carriers for a period $T_B$ wherein $T_B > T_O = 1/f_0$, said demodulator adapted for connection to a transmission medium and responsive to signals received therefrom said demodulator comprising:

first means for generating representations of a plurality of corresponding information sub-carriers each nominally of frequency equal to the frequency of said plurality of information sub-carriers, correlating means for correlating said signal received from said transmission medium with representations of each of said corresponding information sub-carriers for a period $T_O < T_B$, and decoding means responsive to said correlating means for detecting the information portion originally modulating said information sub-carriers.

2. The apparatus of claim 1 wherein said modulator includes:

means for generating representations of a further plurality of sub-carriers synchronous with said information sub-carriers and also harmonically related to $f_0$, and means for transmitting said further plurality of sub-carriers.

3. The apparatus of claim 2 wherein said demodulator includes:

second means for generating representations of a plurality of sub-carriers each nominally frequency and phase coherent with a different one of said further plurality of sub-carriers, said correlating means also correlating the output of said second means with said signal from said transmission medium.

4. The apparatus of claim 1 wherein said means for generating comprises:

a first memory means for storing a representation of at least a single phase representation for each of said sub-carriers, means for operating on said stored representations to simulate phase change as a function of time and to store the result in said first memory means, and means for periodically outputting a phase representation for each of said sub-carriers from said first memory means.

5. The apparatus of claim 4 in which said means for modulating comprises:

means responsive to an information portion for deriving a corresponding phase change representation, and means for summing a stored phase representation and a corresponding phase change representation.

6. The apparatus of claim 5 which includes an amplitude memory with a storage location for each of said sub-carriers, and in which said means for modulating includes means responsive to an information portion for deriving a representation of a corresponding sub-carrier amplitude, and means for storing said corresponding sub-carrier amplitude representation in said amplitude memory means.

7. The apparatus of claim 4 in which said means for transmitting includes:

second memory means for storing a representation of a trignometric function, means coupling said phase representation from said first memory means as an addressing input to said second memory means, an accumulator coupled to said second memory means for accumulating a phase representation from each said sub-carrier, and, means for outputting said accumulated result to said transmission medium and for thereafter clearing said accumulator.

8. The apparatus of claim 7 which includes an amplitude memory and in which said means for modulating comprises means responsive to an information portion for deriving a corresponding phase change and amplitude representation, means for summing a stored phase representation and a corresponding phase change representation, and means for storing said corresponding amplitude representation.

9. The apparatus of claim 8 in which said means for transmitting further includes means for coupling said corresponding amplitude representation to said second memory means as a further addressing input.

10. The apparatus of claim 3 which further includes decision means responsive to said correlating means for producing said information portion originally used to modulate an associated information sub-carrier.

11. The apparatus of claim 10 wherein said correlating means produces a vector for each sub-carrier representing phase and amplitude of said sub-carrier with respect to associated sub-carriers locally generated by said second means.

12. The apparatus of claim 11 in which said decision means includes means to compare a said vector representation for each of said information sub-carriers with nominal vector representations to produce said information portions.

13. The apparatus of claim 12 in which said vector is represented by orthogonal vector components and in which said means to compare successively subtracts a predetermined quantity from each of said components to determine a nominal vector representation most nearly identical with a vector produced by said correlating means.

14. The apparatus of claim 13 in which said decision means includes means to store a predetermined quantity for each of said information sub-carriers and adjusting means to adjust said predetermined quantity in response to said means to compare.

15. The apparatus of claim 10 in which said decision means includes means responsive to correlation of a pair of said further sub-carriers to control timing of said correlating means.

16. A low baud rate, high bit rate modem adapted for efficient information transfer through a communication medium with good tolerance to noise bursts and effective to time the demodulation process to compensate for phase distortion, frequency offset and amplitude distortion comprising a modulator and demodulator, said modulator comprising:
a sub-carrier generator for generating representations of a plurality of information and timing sub-carriers,
first means responsive to digital information signals for periodically modulating each of said information sub-carriers once per baud time,
means for accumulating a representation of each of said sub-carriers and transmitting a sum of said representation a fixed plurality of times within each said baud time,
said demodulator comprising:
a timing unit,
A/D converting means responsive to a received signal for periodically producing a digital representation thereof when initiated by said timing unit,
a second sub-carrier generator for generating representations of a second plurality of information and timing sub-carriers, each nominally frequency coherent with a different sub-carrier of said first plurality,
correlating means for correlating said first and second plurality of sub-carriers,
decision means responsive to said correlating means with respect to said information sub-carriers for recreating digital signals representative of said modulating digital information signals and for compensating for phase and amplitude distortion and responsive to said correlating means with respect to said timing sub-carriers for compensating for frequency offset and for inhibiting said timing unit to enable said A/D converting means and said correlating means only for a period $T_O$, less than said baud time, wherein said period $T_O$ is a period of a fundamental $f_0$ of each of said sub-carriers.

17. The apparatus of claim 16 wherein said correlating means produces vector signals representing a pair of components of a vector defining amplitude and phase of each of said plurality of information sub-carriers, and wherein said decision means includes
means to subtract a sub-carrier related parameter from each of said components to identify said modulating digital information and to also derive signals representing phase distortion and amplitude distortion,
means for modifying said sub-carrier related parameter with said amplitude distortion representing signal,
and wherein said second sub-carrier generator is responsive to said phase distortion representing signal to thereby compensate for said phase distortion.

18. The apparatus of claim 16 wherein said decision means is responsive to said correlating means with respect to a timing sub-carrier in adjacent baud times for detection of frequency offset, and wherein said modem includes means responsive to said decision means for compensation of frequency offset.

19. The apparatus of claim 16 wherein said correlating means produces vector signals representing a pair of components of a vector defining amplitude and phase for at least one of said timing sub-carriers and wherein said decision means includes:
means to detect phase rotation of said timing sub-carrier across a baud boundary by comparing said pair of components in adjacent baud intervals,
and means included within said second sub-carrier generator for effecting compensation for said phase rotation for all said sub-carriers.

20. The apparatus of claim 19 wherein said second sub-carrier generator includes
means for generating a plurality of phase representing samples for each of said sub-carriers within each baud time, said last-named means producing samples representing phase separated by a fixed increment of time,
frequency offset correction means for modifying each phase increment equally for each said sub-carrier in response to said detection of phase rotation of said timing sub-carrier.

21. The apparatus of claim 16 wherein said correlating means includes
multiplying means for multiplying each digital representation of a received signal by a quadrature offset samples of each of said second plurality of sub-carriers and means for accumulating products of said multiplication for each sub-carrier for said baud time,
and wherein said decision means includes:
means responsive to said accumulated products for comparing said accumulated products to a set of nominal products each representing a different one of said digital information signals to detect said digital information signal modulating a respective sub-carrier.

22. The apparatus of claim 16 wherein said sub-carrier generator generates a set of phase representations for each of said sub-carriers and wherein said first means modifies each representation in said set by an amount representative of said digital information signals.

23. The apparatus of claim 22 wherein said
sub-carrier generator includes a register with at least a stage for each of said sub-carriers for storing a phase representing quantity and also includes
summing means for modifying said phase representing quantity to represent time related phase change and in which said modulating means includes an input to said summing means to further modify said phase representative quantity by said digital information signal, and
means for periodically generating a sub-carrier sample froom said phase representing quantity.

24. The apparatus of claim 23 wherein said sub-carrier generator includes a further register with at least one stage for each of said sub-carriers for storing sub-carrier amplitude representing information, and, means for loading said further register at least once every baud time in response to said digital information signals.

25. The apparatus of claim 24 wherein said means for periodically generating a sub-carrier sample comprises means responsive to said register and further register to generate $A \sin \theta$ wherein $\theta$ is derived from said register and A is derived from said further register.

26. The apparatus of claim 23 wherein said register is a shift register which is periodically clocked to cycle completely once for each of a plurality of sampling intervals within a baud time, said summing means comprising a modulo Z adder (wherein Z represents $2\pi$) and wherein said sampling interval is selected to comprise a period $n\Delta t$ wherein there are n sub-carriers and said time related phase change is k where k is sub-carrier harmonic index.

27. The apparatus of claim 17 in which said second sub-carrier generator includes:

a register with at least a stage for each of said second plurality of sub-carriers for storing in each stage a phase representing quantity, an adder coupling a register output back to a register input, said adder having an input for modifying a phase representing in a stage of said register and an output coupled to said correlating means.

28. The apparatus of claim 27 wherein said sub-carrier generator further includes means for periodically generating a signal representative of time related phase change coupled to said adder input, said last named means including means responsive to detected frequency offset for adjusting said time related phase change equally for each of said sub-carriers.

29. The apparatus of claim 28 wherein said register is a shift register and wherein said second sub-carrier generator includes:

a second adder with a pair of inputs and an output, a first input coupled to an output of said adder and a second input alternating between zero and a representation of $\pi/2$, said second input alternating at least once for each output of said adder, and means responsive to an output of said second adder for deriving a trignometric function thereof which is coupled to said correlating means.

30. A method of data transmission suitable for the transmission of digital data over a switched network and for reducing the effects of distortion, comprising the transmitting steps of:

(a) generating within a selected time interval $T_b$ at least plural samples of each of a plurality of sub-carriers, each of said sub-carriers being harmonics of a fundamental $f_0$, (b) modifying samples of different ones of said sub-carriers in accordance with intelligence to be transmitted at a rate no higher than once within said selected time interval $T_b$, wherein said fundamental period $T_O$ is less than $T_b$, (c) summing a sample from each of said sub-carriers to produce a sum, (d) transmitting a signal representative of said sum, (e) repeating steps (c) and (d) a number of times within said selected time interval $T_b$, and the receiving steps of:

(f) sampling a received signal, (g) correlating samples of said received signal with samples of a plurality of locally generated sub-carriers throughout the interval $T_O$ less than $T_b$, (h) detecting said intelligence by the result of said correlation, and (i) adjusting frequency and absolute phase of said locally generated sub-carriers to achieve coherency between transmitter sub-carriers and receiver sub-carriers in response to said correlation.

31. The method of claim 30 in which said correlating step comprises the steps of:

(i) multiplying each of a time series of received signal samples by a pair of signals representing quadrature components for each sub-carrier, said time series occupying a time $T_0$ less than $T_b$, and (ii) accumulating sums of said pairs of products for each said sub-carrier.

32. The method of claim 30 in which said detecting step comprises the steps of:

(i) comparing the correlation result for each sub-carrier with nominal results to determine the closest nominal result to thereby identify said transmitted intelligence.

33. The method of claim 30 in which said adjusting step comprises the steps of:

(i) comparing correlation results of a single sub-carrier in adjacent time intervals, and (ii) modifying frequency of said locally generated sub-carriers in a direction and amount to achieve nominally equal correlation results of said single sub-carrier in adjacent time intervals.

34. The method of claim 30 in which said adjusting step comprises the steps of:

(i) summing phase change and phase distortion separately for each sub-carrier, and (ii) modifying a phase representation of each of said locally generated sub-carriers by an amount equal to said sum of said step (i).

35. The method of claim 30 in which said correlating step produces a vector representation of sub-carrier phase and amplitude for each sub-carrier and in which said detecting step includes the steps of:

(i) successively subtracting a sub-carrier related parameter from said vector representation to determine nominal phase change, nominal amplitude, amplitude distortion and phase distortion, and (ii) outputting a quantity in accordance with nominal phase change and nominal amplitude, representing said transmitted intelligence.

36. The method of claim 35 in which said adjusting step includes the steps of:

(i) summing for each sub-carrier nominal phase change and phase distortion, (ii) incrementing a phase representation of each sub-carrier by said sum of said step (i), and (iii) modifying said sub-carrier related parameter in accordance with said detected amplitude distortion.

* * * * *